(12) United States Patent
Pankaj et al.

(10) Patent No.: US 10,800,604 B2
(45) Date of Patent: Oct. 13, 2020

(54) STORAGE BOX AUXILIARY DEVICE AND AVIATION CONTAINER

(71) Applicant: Innovation Thru Energy Co Ltd., Tokyo (JP)

(72) Inventors: Garg Pankaj, Tokyo (JP); Satoshi Nagai, Ishikawa (JP)

(73) Assignee: Innovation Thru Energy Co Ltd., Tokyo (JP)

( * ) Notice: Subject to any disclaimer, the term of this patent is extended or adjusted under 35 U.S.C. 154(b) by 0 days.

(21) Appl. No.: 15/739,507

(22) PCT Filed: Jul. 17, 2015

(86) PCT No.: PCT/JP2015/070604
§ 371 (c)(1),
(2) Date: Dec. 22, 2017

(87) PCT Pub. No.: WO2017/013721
PCT Pub. Date: Jan. 26, 2017

(65) Prior Publication Data
US 2018/0186563 A1    Jul. 5, 2018

(51) Int. Cl.
*B60P 7/13*    (2006.01)
*B65D 90/00*    (2006.01)
(Continued)

(52) U.S. Cl.
CPC .............. *B65D 90/004* (2013.01); *B60P 7/13* (2013.01); *B64D 9/00* (2013.01); *B64D 9/003* (2013.01);
(Continued)

(58) Field of Classification Search
CPC ...... B65D 88/14; B65D 90/00; B65D 88/129; B65D 90/0046; B65D 88/12;
(Continued)

(56) References Cited

U.S. PATENT DOCUMENTS

| 2,625,118 | A | * | 1/1953 | Lechner | B64D 9/00 |
| | | | | | 410/104 |
| 2,701,068 | A | * | 2/1955 | Douglas | B64C 1/22 |
| | | | | | 244/137.1 |

(Continued)

FOREIGN PATENT DOCUMENTS

| JP | 54-159082 A | 12/1979 |
| JP | 5-139488 A | 6/1993 |

(Continued)

OTHER PUBLICATIONS

International Search Report dated Nov. 24, 2015 for PCT/JP2015/070604.

*Primary Examiner* — Stephen T Gordon
(74) *Attorney, Agent, or Firm* — Knobbe Martens Olson & Bear, LLP

(57) ABSTRACT

Presenting an auxiliary storage apparatus and aircraft container that enables existing non-regulated temperature containers to be equipped with specific features such as cooling, heating, and humidifying features. The storage container with specific features is inserted into a non-regulated temperature container for aircraft use and affixed to the interior of the non-regulated temperature container by the auxiliary storage apparatus, which includes a wire that passes over the storage container, hooks and pulleys that affix to existing support brackets located on four corners of a floor surface, and a turnbuckle. One end of the wire hooks onto a first hook. The wire passes over the storage container and winds around the pulleys. The other end of the wire attaches to a second hook using the turnbuckle. During operation of the turnbuckle, the wire tightens against the storage container, and the storage container is affixed to the interior of the non-regulated temperature container.

6 Claims, 15 Drawing Sheets

(51) Int. Cl.
| | |
|---|---|
| *B65D 67/02* | (2006.01) |
| *B65D 67/00* | (2006.01) |
| *B64D 9/00* | (2006.01) |
| *B65D 88/02* | (2006.01) |
| *B65D 85/00* | (2006.01) |
| *B65D 85/62* | (2006.01) |
| *B65D 88/12* | (2006.01) |

(52) U.S. Cl.
CPC ............ B65D 67/00 (2013.01); B65D 67/02 (2013.01); B65D 85/54 (2013.01); B65D 85/62 (2013.01); B65D 88/027 (2013.01); B65D 88/129 (2013.01); B65D 90/006 (2013.01); B65D 90/0046 (2013.01); B65D 90/0053 (2013.01)

(58) Field of Classification Search
CPC ...... B65D 90/004; B65D 88/00; B65D 85/54; B65D 88/022; B65D 85/62; B65D 88/027; B65D 67/02; B65D 67/00; B65D 88/74; B65D 90/0053; B65D 90/006; B65D 90/12; B65D 85/50; B65D 81/18; B65D 2590/0066; B64D 9/00; B64D 9/003; B60P 7/13

USPC ........... 410/2, 8, 11, 46, 67, 81, 97; 220/1.5, 220/23.89, 560.11, 482, 23.87, 23.88; 244/137.1, 118.1

See application file for complete search history.

(56) References Cited

U.S. PATENT DOCUMENTS

| | | | |
|---|---|---|---|
| 3,966,075 A * | 6/1976 | Schultz | B65D 88/005 220/1.5 |
| 4,496,271 A * | 1/1985 | Spinosa | B64C 1/20 410/105 |
| 6,824,338 B2 * | 11/2004 | Looker | B60P 7/13 410/46 |
| 8,956,094 B2 * | 2/2015 | Thoma | B60P 7/0807 410/97 |
| 2005/0051544 A1 * | 3/2005 | Looker | B65D 88/14 220/1.5 |
| 2012/0163939 A1 * | 6/2012 | Grainger | B65D 90/0073 410/46 |
| 2015/0060440 A1 * | 3/2015 | Lippold | B65D 81/3811 220/1.5 |

FOREIGN PATENT DOCUMENTS

| | | |
|---|---|---|
| JP | 2001-354291 A | 12/2001 |
| JP | 2004-315071 A | 11/2004 |

* cited by examiner

STORAGE BOX AUXILIARY DEVICE AND AVIATION CONTAINER

CROSS REFERENCE TO RELATED APPLICATIONS

This application is a U.S. National Phase Application of PCT International Application Number PCT/JP2015/070604, filed on Jul. 17, 2015, designating the United States of America and was published in Japanese. The disclosures of the above-referenced applications are hereby expressly incorporated by reference in their entireties.

TECHNICAL FIELD

This invention refers to the auxiliary storage apparatus and aircraft container used to carry cargo on planes.

BACKGROUND

Aircraft containers are used to transport cargo on planes. The cargo is placed in the aircraft container, which is then placed in the cargo area located in the bottom portion of the aircraft.

In addition to non-regulated temperature aircraft containers for regular goods, there are containers that come with a variety of features such as insulated containers for perishable goods and containers with adjustable temperature and humidity settings used to transport precision machinery.

Regarding the air transport of perishable goods, there are cases in which the goods are placed inside insulated storage containers, which are then placed in a non-regulated temperature container. The mechanics behind this is explained in Patent Document 1. The patent document describes an insulated container for the transport of large size fish, such as tuna. The rectangular shape of the container allows for the stacking of goods inside to maximize the use of the space. Additionally, space can be left between the two sides of each insulated container to create a gap for hands for easy unloading.

PRIOR TECHNOLOGY DOCUMENT

Patent Document

[Patent Document 1] Japanese Patent Application Number 2013-23254

INVENTION OVERVIEW

Issue being Targeted by the Invention

As mentioned above, it is possible to place goods into an insulated container and then place that storage container into a non-regulated temperature container. Therefore, by installing an insulated container with a cooling mechanism in a shape that maximizes the interior space of the non-regulated temperature container, the non-regulated temperature container can be used in the same manner as an insulated container.

However, in order to ensure that the heavy storage containers do not move inside of the non-regulated temperature containers, the storage containers must be stabilized and fixed in place.

This invention aims to solve the above-mentioned issue by providing an auxiliary storage apparatus as well as an aircraft container that will stabilize the storage container with specific features inside of a non-regulated temperature container.

Steps to Solving the Issue

The following describes the components that are required in order to achieve the aims of this invention.

(1) The auxiliary storage apparatus affixes the storage container with specific features to the non-regulated temperature container while inserted inside of the aforementioned non-regulated temperature container. The auxiliary storage apparatus features a wire that passes over the aforementioned storage container, hook 1 and hook 2 which are respectively affixed to the 2 support brackets that are located on one of the side walls that extend perpendicularly from the floor surface of the aforementioned storage container and used to join the end brackets of the cargo support belt to the four corners where the aforementioned side walls intersect with the aforementioned floor surface, directional switch element 1 and directional switch element 2 which are affixed to the support brackets that are located on the opposite aforementioned side wall and interact with the aforementioned wire to change the direction in which the aforementioned wire is pulled, and the turnbuckle that hooks onto the aforementioned hook 2, located on the loading entrance side of the aforementioned non-regulated temperature container. The end of the aforementioned wire hooks onto the aforementioned hook 1, located on the back side of the aforementioned non-regulated temperature container. From the aforementioned hook 1, the wire passes over the aforementioned storage container and passes through the directional switch element 1, located on the backside of the aforementioned non-regulated temperature container, then passes through the directional switch element 2, located on the loading entrance side. From the aforementioned directional switch element 2, the wire passes over the aforementioned storage container and the other end of the wire hooks onto the turnbuckle.

(2) The auxiliary storage apparatus affixes the storage container with specific features to the non-regulated temperature container while inserted inside of the aforementioned non-regulated temperature container. The auxiliary storage apparatus features rails on both edges of the aforementioned non-regulated temperature container floor surface that are installed in the same direction that the aforementioned storage container is inserted, the mounting bracket, which affixes the aforementioned rail to the aforementioned non-regulated temperature container by fitting together with the support bracket, located near the floor surface of the side walls that extend perpendicularly from the aforementioned floor surface on both sides, and affixes to the end bracket of the cargo-securing belt, sliding rails that are affixed to the bottom part of the aforementioned storage container and slide along the top of the aforementioned rails when the aforementioned storage container is inserted, and an engaging member that regulates the movement of the aforementioned storage container by joining the aforementioned rail and the aforementioned sliding rail when the aforementioned storage container is inserted into the aforementioned non-regulated temperature container.

(3) With regard to (2), the auxiliary storage apparatus features a lip on the aforementioned floor surface near the aforementioned loading entrance so that the side of the storage container that slides along the aforementioned rail will be at the same height as the top of the lip when the rail is installed.

(4) With regard to (2), the auxiliary storage apparatus features a frame that holds the aforementioned rail on the floor surface.

(5) With regard to (4), the auxiliary storage apparatus features a bearing part that rotates when it comes into contact with the bottom side of the storage container as it is loaded and unloaded.

(6) The aircraft container features an auxiliary storage apparatus from (1) to (5) and a non-regulated temperature container that the auxiliary storage apparatus is housed in.

Based on (1)~(6), it is possible to use the support brackets that attach to the end of the cargo-securing belt in existing containers to install the auxiliary storage apparatus that will stabilize the storage container with specific features as well as make it easier to load and unload. As such, by installing the auxiliary storage apparatus into a non-regulated temperature container and placing a storage container inside that is approximately the same size as the interior of the non-regulated temperature container, the existing container becomes an aircraft container with specific features (ex. cooling, heating, or humidifying).

Benefits of the Invention

With this invention, existing non-regulated temperature containers can be converted to provide cooling, heating, and humidifying features and be used as aircraft containers.

CRITERIA FOR IMPLEMENTATION OF THE INVENTION

Below, a detailed explanation of the invention's embodiment is provided while referencing the exhibits.

Figure 1:
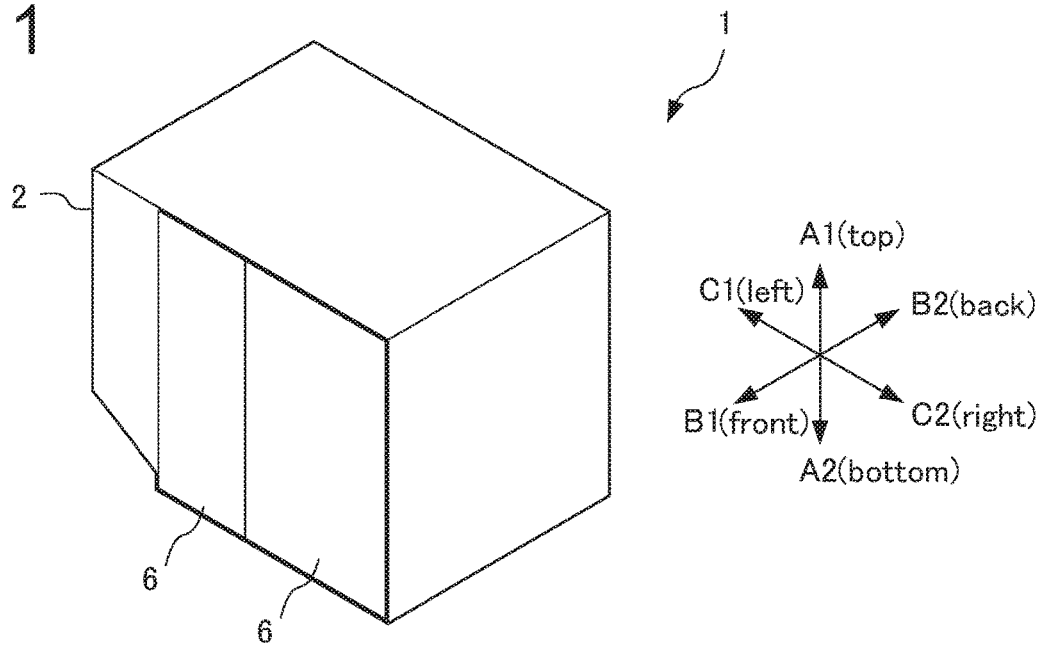
FIG. 1 is a perspective drawing of the exterior of the aircraft container (1) that embodies this invention.
Figure 2:
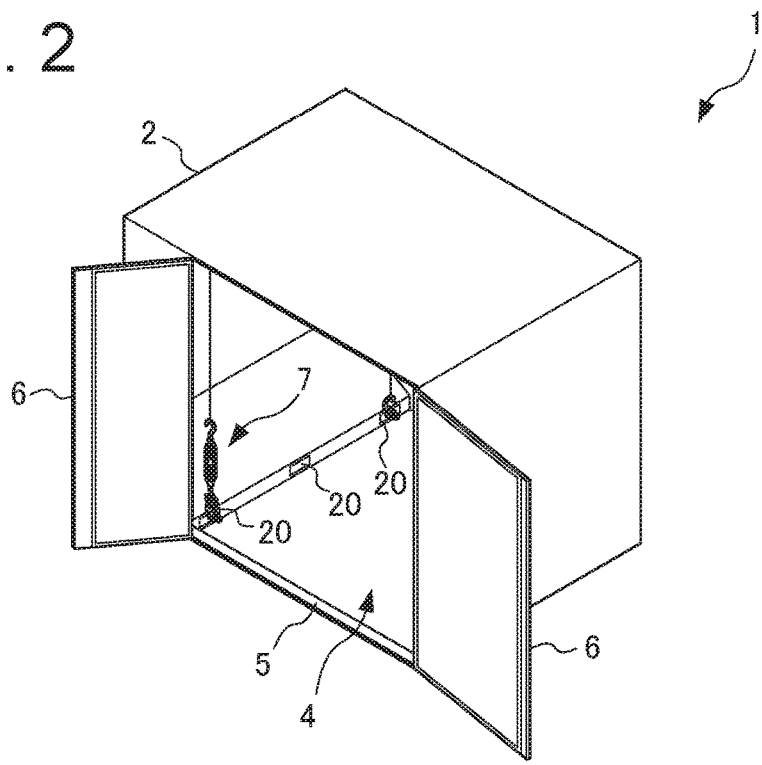
FIG. 2 is a perspective drawing of the opening and closing doors (6) of the aircraft container (1).

FIG. 1 is a perspective drawing of the exterior of the aircraft container (1). FIG. 2 is a perspective drawing of the aircraft container (1) with its opening and closing doors (6) in an open state.

The aircraft container (1) is made up of the container body (2) that is equivalent to a non-regulated temperature container and the auxiliary storage apparatus (7) in this invention's first embodiment.

Container Body

The container body (2) is roughly a rectangular shaped housing. The container body (2) referenced in this embodiment is a standard LD3 model and has a triangular prism shape cut out of one side. Further, it should be noted when reading the explanations below, that in FIG. 1, which is a drawing of the container body (2), that A1 refers to the upward direction, A2 refers to the downward direction, B1 refers to the forward direction, B2 refers to the backwards direction, C1 refers to the left direction, and C2 refers to the right direction. With regard to this embodiment, the bottom left side of the container body (2) is the cut out portion. Additionally, there are times in which C1 and C2 are collectively referred to as the horizontal direction.

The opening and closing doors (6) are located on the front side of the container body (2). When the doors (6) are opened, the loading entrance (4) is exposed. The loading entrance (4) is a rectangular shape and its width is equal to the width of the floor surface while the height of the loading entrance (4) is equal to the height of the container body (2) interior space. Additionally, there is a lip (5) on the edge of the floor surface where it meets the loading entrance (4). The lip (5) extends upward for a few centimeters from the floor surface of the container body (2).

Figure 3:
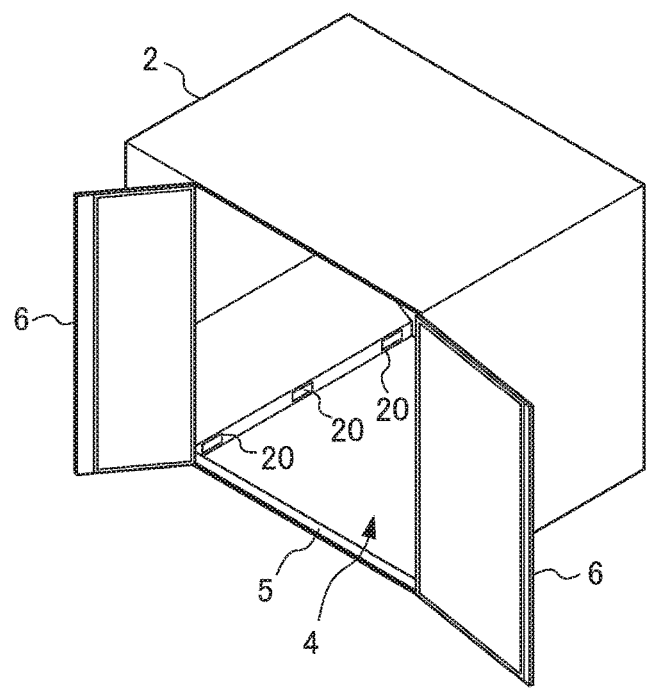
FIG. 3 is a perspective drawing of the exterior of the container body (2).

FIG. 3 is a perspective drawing of the exterior view of the container body (2). Support brackets (20) are installed in the container body (2). Various fittings can be attached to the support brackets (20). For example, a metal ring can be attached to the support bracket (20) in order to hook on the mounting bracket for the cargo-securing belt so that the securing belt can be used to keep the cargo held inside of the container body (2) from shifting.

Figure 4:
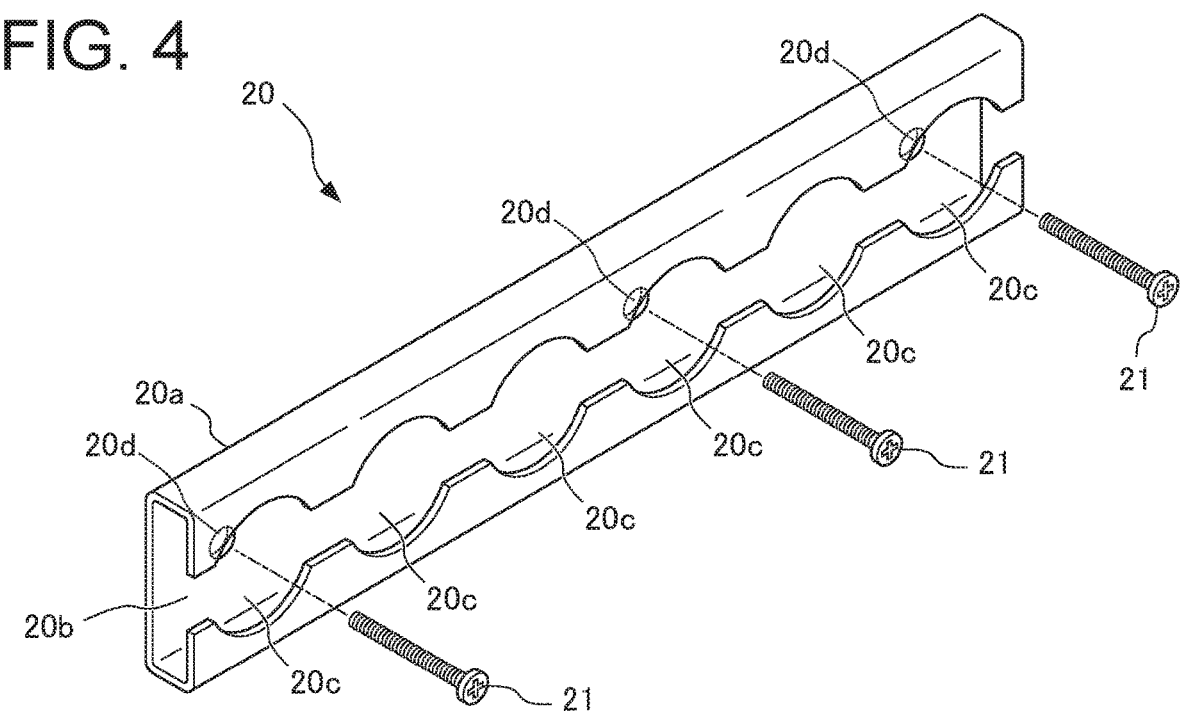
FIG. 4 is a perspective drawing of the exterior of the support bracket (20).
Figure 5:
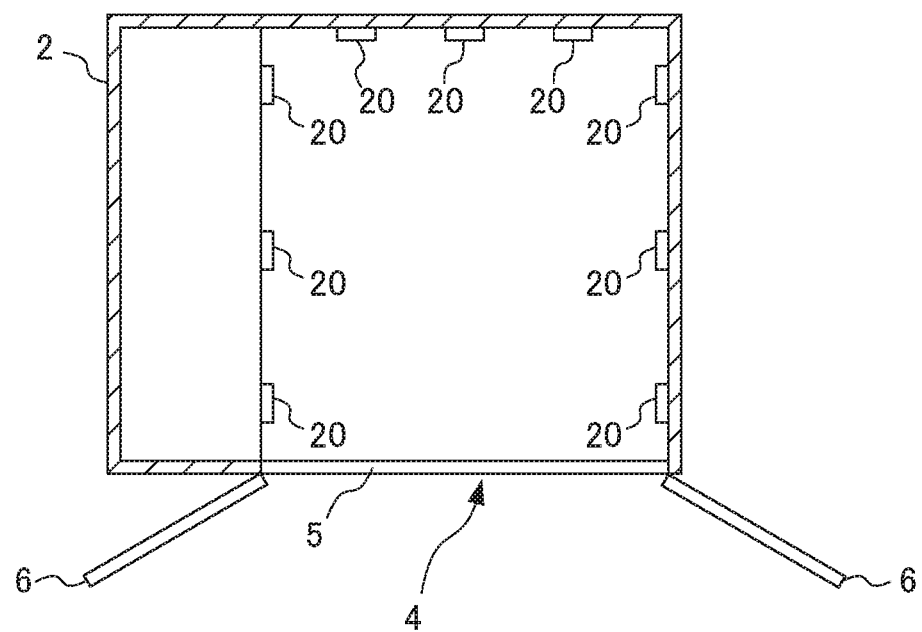
FIG. 5 is a two-dimensional drawing of the support bracket (20) installation.

FIG. 4 is a perspective drawing of the exterior view of the support bracket (20), and FIG. 5 is a two-dimensional drawing of the support bracket (20) installation. The support bracket (20) is made up of the main body part (20a), slit part (20b), widened part (20c), and hole (20d).

The main body part (20a) is a tubular metal web based girder that has two 90-degree bends on the both of its ends (length-wise) that create a C-like shape. The slit part (20b) is the straight gap that is formed between the two ends (length-wise) of the main body part (20a).

The widened part (20c) refers to the areas of the slit part (20b) that are widened in multiple locations (in this embodiment, there are 6 such locations). The widened part (20c) is arc-shaped. When viewing the main body part (20a) (on the side that the slit part (20b) and widened part (20c) are located on) from the front, the central axis of the main body part (20a) and the axis line of the slit part (20b) coincide and the center of the arc of the widened part (20c) is located on the central axis of the main body part (20a).

A screw (21) that attaches the support bracket (20) to the container body (2) is inserted into the hole (20d). The holes (20d) are located in three spots along the main body part (20a) and in same region as the widened part (20c).

As shown in FIG. 5, the support brackets (20) are located along the bottom of the left side, right side, and back side of the container body (2). In other words, they are located near the floor surface in groups of 3. The slit part (20b) of the three support brackets (20) is installed length-wise along the container body (2) by a screw (21) so that the screw head (21) enters the hole (20d) and becomes flush with the interior surface of the support bracket (20).

First Embodiment of the Auxiliary Storage Apparatus

Figure 6:
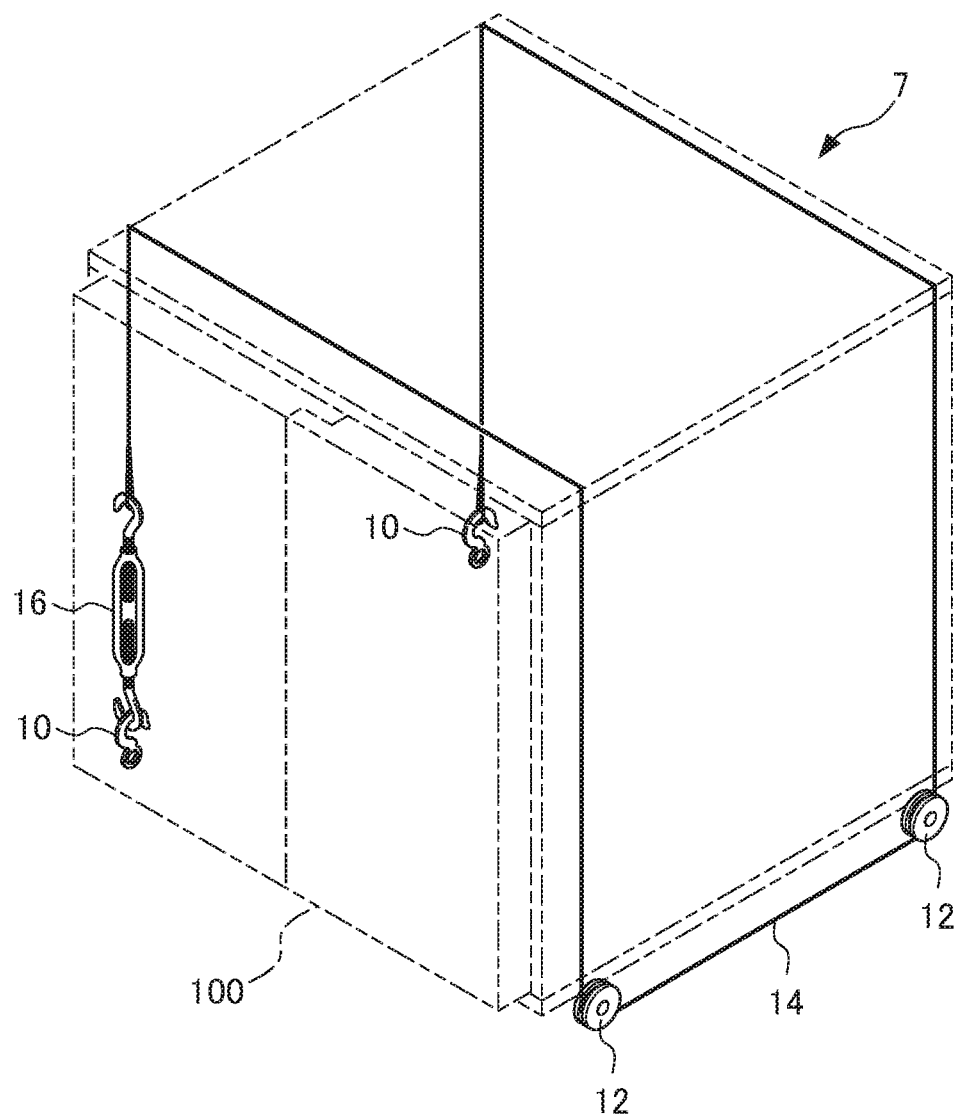
FIG. 6 is an illustration of the auxiliary storage apparatus (7) and its components in this invention's first embodiment.

FIG. 6 is an illustration of the auxiliary storage apparatus (7) and its components in this invention's first embodiment. The auxiliary storage apparatus (7) consists of the hooks (10, 10), the pulleys (12, 12), the wire (14), and the turnbuckle (16).

The auxiliary storage apparatus (7) is used to stabilize the storage container (100) when it is placed on the floor surface of the container body (2), as shown in FIG. 2, so that the storage container (100) does not move.

The hooks (10, 10), are located along the left side of the container body (2) on the loading entrance (4) side (front side) and far side of the loading entrance (4) (back side). The pulleys (12, 12) are located along the right side of the container body (2) on the loading entrance (4) side (front side) and far side of the loading entrance (4) (back side). The wire (14) is hooked onto the hook (10) located on the back side. From the hook (10), the wire (14) passes over the storage container (100) and passes through the pulley (12) located on the back side. The wire (14) then passes through the pulley (12) located on the front side and passes over the storage container (100) where the other end of the wire (14) attaches to the turnbuckle (16) which acts as an intermediary that hooks onto the hook (10) located on the front side. Workers can adjust the turnbuckle (16) so that the storage container (100) is stabilized onto the container body (2) by the wire (14).

The hook (10) on the far side of the loading entrance (4) (back side) on the left side is considered hook 1, and the hook (10) on the loading entrance (4) side (front side) of the left side is considered hook 2. The pulley (12) on the far side of the loading entrance (4) (back side) on the right side is considered directional switch element 1, and the pulley (12) on the loading entrance (4) side (front side) of the right side is considered directional switch element 2.

Figure 7:
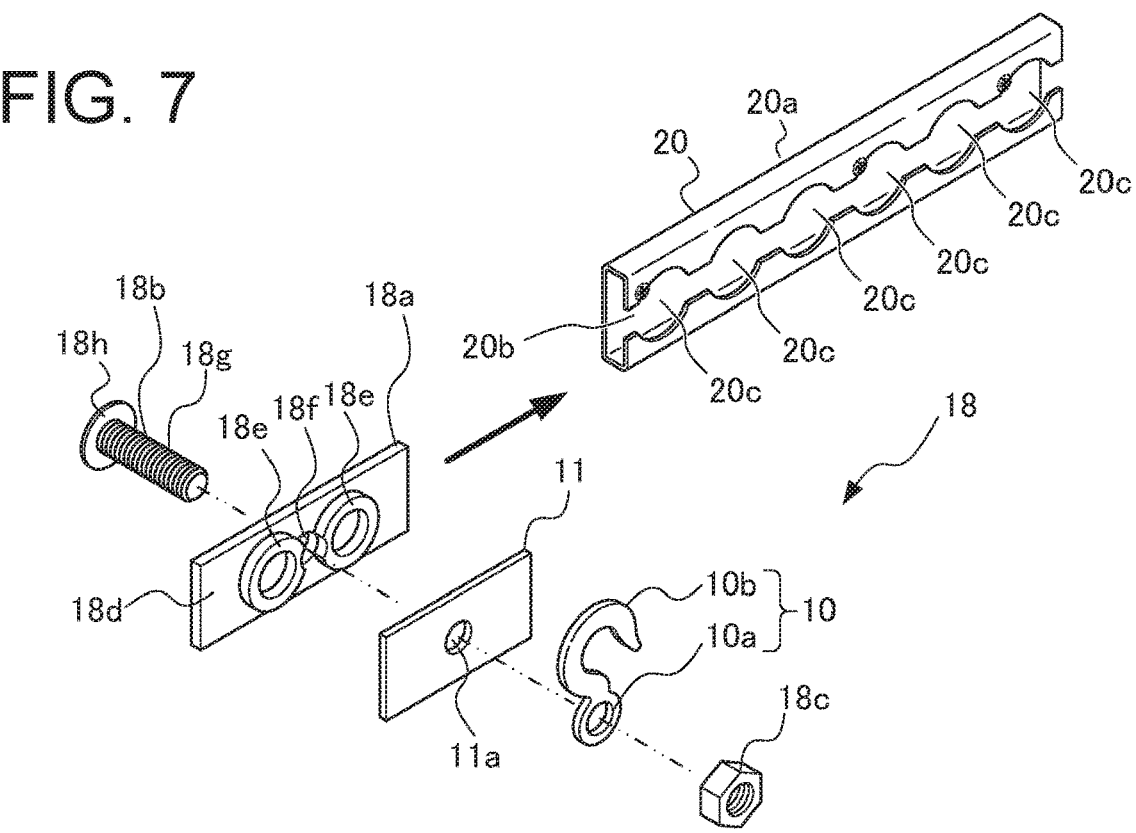
FIG. 7 is an illustration of the hook (10) and the parts that are used to attach the hook (10) to the support bracket (20).

FIG. 7 is an illustration of the hook (10) and the parts that are used to attach the hook (10) to the support bracket (20). The auxiliary storage apparatus (7) also includes a rectangular plate (11) and fitting connection (18).

The hook (10) is made of metal and consists of the ring part (10a) and the hook part (10b) that extends from the ring part (10a).

The rectangular plate (11) is made of a rectangular shaped metal plate and has a hole (11a) in the center that is the same diameter as the inside diameter of the ring part (10a).

The fitting connection (18) consists of a slide plate (18a) that slides into the support bracket (20), a bolt (18b), and a nut (18c) that screw onto the bolt (18b).

The slide plate (18a) consists of the metal plate (18d), two protruded parts (18e, 18e), and a hole (18f).

When the metal plate (18d), which is a rectangular plate, is inserted into the support bracket (20), its size is equivalent to two of the widened parts (20c). The two protruded parts (18e, 18e) are located on the metal plate (18d) to match the location of the two widened parts (20c) and are circular shaped so that they can be fitted to the two widened parts (20c). The hole (18f) is located in between the two protruded parts (18e, 18e). The bolt (18b) is inserted into the hole (18f). The diameter of the hole (18f) is the same as the width of the slit part (20b). Further, when the metal plate (18d) is inserted into the support bracket (20), the hole (18f) matches the location of the slit part (20b). When viewing the metal plate (18d) from the front, the hole (18f) takes up a portion of the space held by the protruding parts (18e, 18e). In this embodiment, there is a corresponding missing section on both of the protruding parts (18e, 18e) that creates a circular opening so that the male screw (18g) can fit in between the protruding parts (18e, 18e) and attach to the bolt (18b).

The bolt (18b) is comprised of the male screw (18g) that is inserted in the hole (18f) and the head (18h) located at the end of the male screw (18g). The male screw (18g) is roughly cylindrically shaped with a diameter that is smaller than the width of the slit part (20b) so that it can be inserted into the slit part (20b). The head (18h) is roughly cylindrically shaped with a diameter that is larger than the slit part (20b). The bolt (18b) is inserted into the hole (18f) through the metal plate (18d) from the side that is opposite from the two protruding parts (18e, 18e) so that the head (18h) comes in contact with the rim of the hole (18f) and the distal end of the male screw (18g) protrudes out from in between the protruding parts (18e, 18e). In this embodiment, the bolt (18b) will remain protruding from in between the protruding parts (18e, 18e) since the protruding parts (18e, 18e) support the bolt (18b) as the male screw (18g) passes through the protruding parts (18e, 18e) and keeps the bolt (18b) from tilting.

Further, the interior diameter of the ring part (10a) of the hook (10) and diameter of the hole (11a) of the rectangular plate (11) are set up so that the bolt (18b) can be inserted. Also, the rectangular plate (11) is sized so that it can cover the protruding parts (18e, 18e) on the slide plate (18a).

Figure 8:
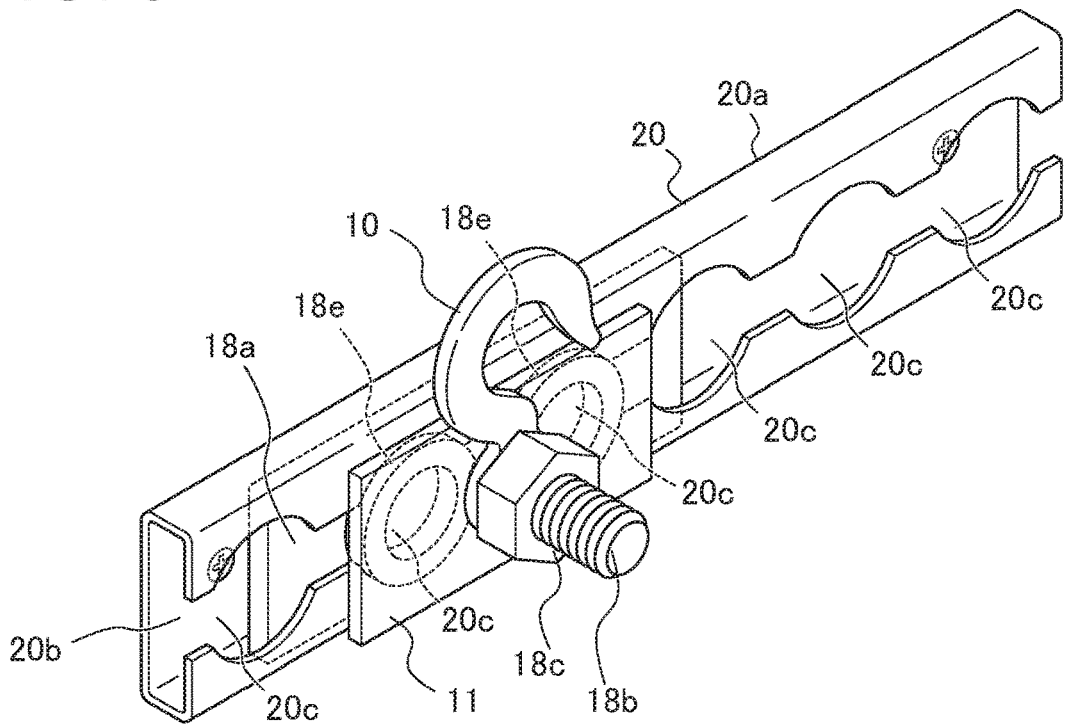
FIG. 8 is a perspective drawing of the hook (10) attached to the support bracket (20).

When the operator inserts the slide plate (18a) into the support bracket (20) and the bolt (18b) is aligned with the center of two adjacent widened parts (20c, 20c) on the slit part (20b), the protruding parts (18e, 18e) face the widened parts (20c, 20c). By screwing in the bolt (18b), the protruding parts (18e, 18e) on the slide plate (18a) fit into the widened parts (20c, 20c) as shown in FIG. 8. As such, the sliding movements on the slide plate (18a) in relation to the support bracket (20) are regulated and the bolt (18b) will continue to protrude from the support bracket (20).

When the operator inserts the distal end of the bolt (18b) through the hole (11a) of the rectangular plate (11) and through the ring part (10a) of the hook (10), and the nut (18c) is fastened so that the protruding parts (18e, 18e), rectangular plate (11), and the hook (10) are pressed together, the hook (10) is affixed to the supporting bracket (20) as shown in FIG. 8.

Figure 9:
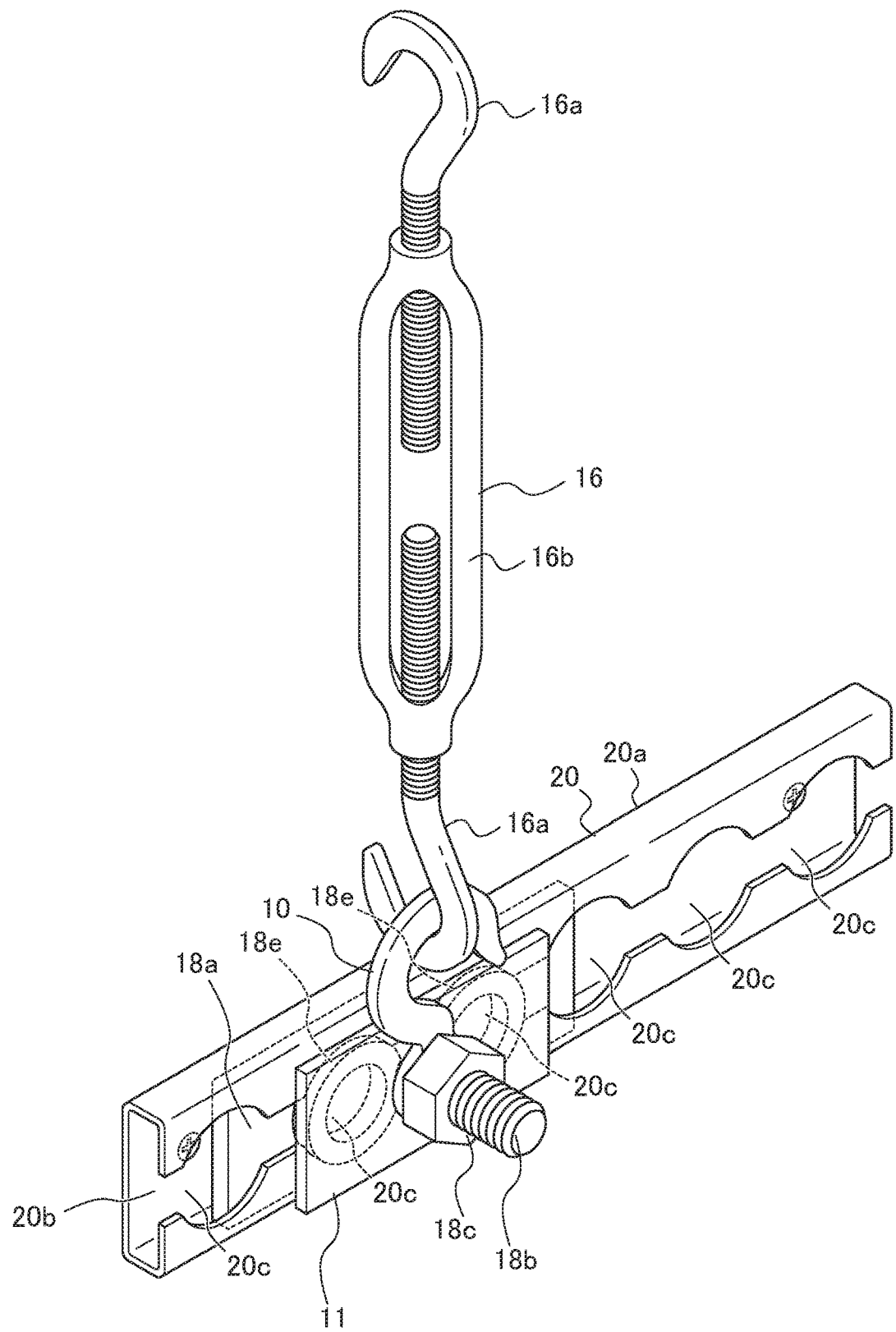
FIG. 9 is a perspective drawing of the turnbuckle (16) attached to the hook (10).

As shown in FIG. 9, the turnbuckle (16) is comprised of two hooks (16a, 16a), which are shaped like a hook on one end and have threads cut into the other end, and the main body (16b), which has an annular shape with two threaded holes that screw onto the two hooks (16a, 16a). The two hooks (16a, 16a) have threads in opposite directions. The thread grooves of the two threaded holes of the main body (16b) are also in opposite directions. When the two hooks (16a, 16a) are screwed into the two threaded holes of the main body (16b), the hooks (16a, 16a) are coaxially located and the threaded bolt ends face each other inside of the main body (16b). With this setup, the hooks (16a, 16a) separate and come together based on the turning of the main body (16b).

The hook (16a) on one end of the turnbuckle (16) hooks onto the hook (10) that is affixed to the support bracket (20) located on the front of the left side of the container body (2). The other hook (16a) hooks onto the end of the wire (14) as shown in FIG. 6.

Figure 10:
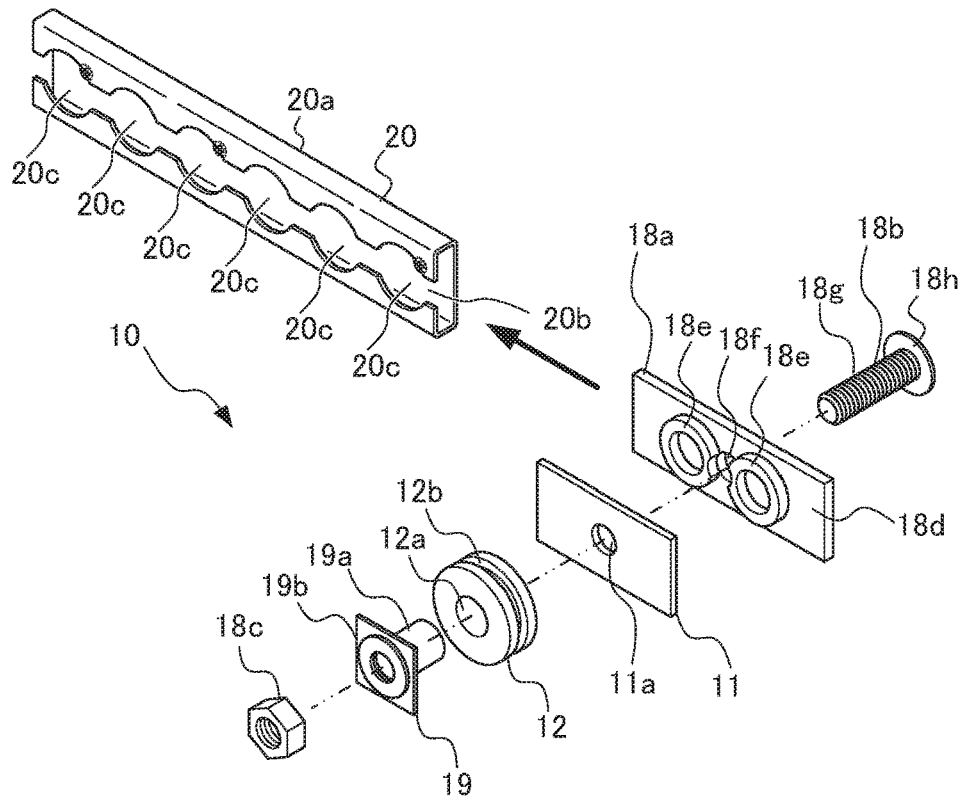
FIG. 10 is an illustration of the pulley (12) and the pulley (12) and the parts that are used to attach the pulley (12) to the support bracket (20).

FIG. 10 is an illustration of the pulley (12) and the parts that are used to attach the pulley (12) to the support bracket (20).

The pulley (12) has a center hole (12a) and a ring-shaped groove (12b) on the peripheral surface. Additionally, the pulley (12) is affixed to the support bracket (20) using the rectangular plate (11), the fitting connection (18), and the flange (19).

Descriptions of the rectangular plate (11) and fitting connection (18) are the same as above.

The flange (19) is comprised of the cylindrical part (19a) and the flange part (19b) that is attached perpendicularly to the central axis on one end of the cylindrical part (19a). The interior diameter of the cylindrical part (19a) is the same as that of the hole (11a) of the rectangular plate (11) so that the bolt (18b) can pass through. The exterior diameter of the cylindrical part (19a) is slightly smaller than the interior diameter of the center hole (12a) of the pulley (12). That is to say, it is possible for the cylindrical part (19a) to pass through the center hole (12a) of the pulley (12).

Figure 11:
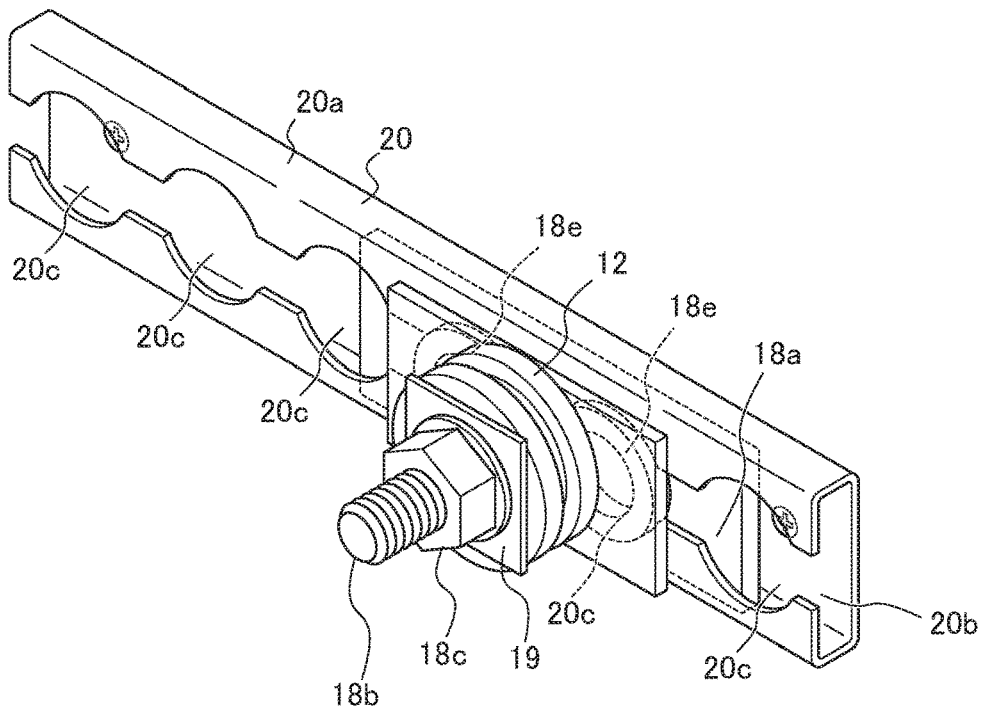
FIG. 11 is a perspective drawing of the pulley (12) attached to the support bracket (20).

Similar to the way in which the hook (10) is affixed to the support bracket (20) described above, when the operator inserts the slide plate (18a) into the support bracket (20) and the bolt (18b) is aligned with the center of two adjacent widened parts (20c, 20c) on the slit part (20b), the protruding parts (18e, 18e) face the widened parts (20c, 20c). By screwing in the bolt (18b), the protruding parts (18e, 18e) of the slide plate (18a) fit into the widened parts (20c, 20c) as shown in FIG. 11.

Further, the operator will insert the distal end of the bolt (18b) into the hole (11a) of the rectangular plate (11), insert the cylindrical part (19a) of the flange (19) into the center hole (12a) of the pulley (12), and insert the bolt (18b) into the cylindrical part (19a). Then, the nut (18c) will be affixed to the bolt (18b) so that the protruding parts (18e, 18e), the rectangular plate (11), and the cylindrical part (19a) are pressed together. With this setup, the pulley (12) is affixed to the support bracket (20) with the cylindrical part (19a) of the flange (19) acting as its axis on which to rotate on.

Storage Container with Cooling Feature

Figure 12:
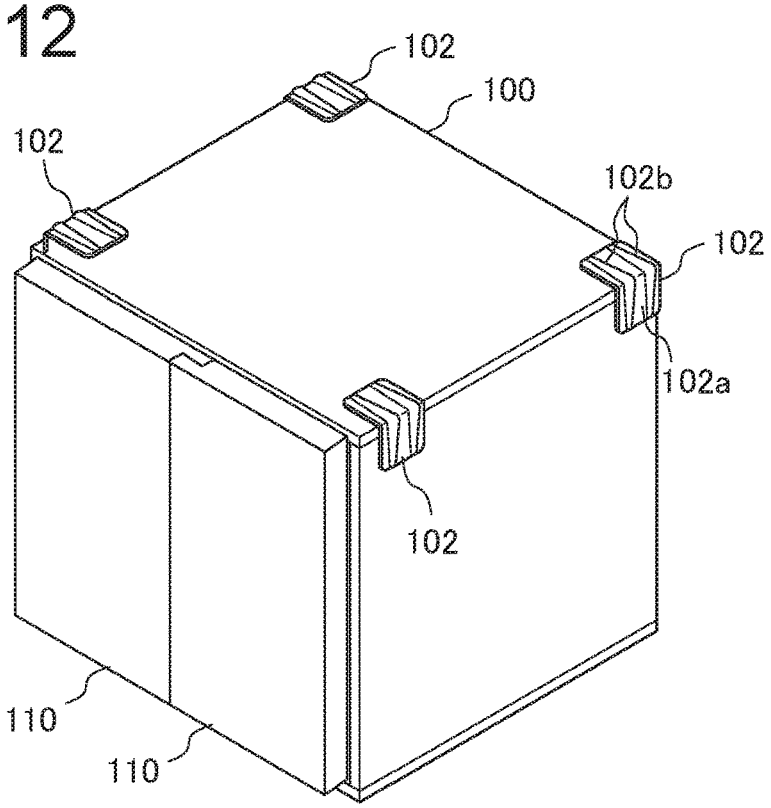
FIG. 12 is a perspective drawing of the structure of the storage container (100).

FIG. 12 is a perspective drawing of the structure of the storage container (100). The storage container (100) is a rectangular box shape that is slightly smaller than the interior space of the container body (2). The storage container (100) has double opening and closing doors (110). When the doors (110) are opened, goods can be inserted or removed.

While not illustrated in FIG. 12, on the interior walls of the storage container (100), there are multiple compartments for holding cooling/insulating materials. By lining up multiple cooling/insulating materials in these compartments, the interior walls of the storage container (100) are filled with cooling materials, and the storage container (100) becomes equipped with cooling features.

Aircraft Container

Figure 13:
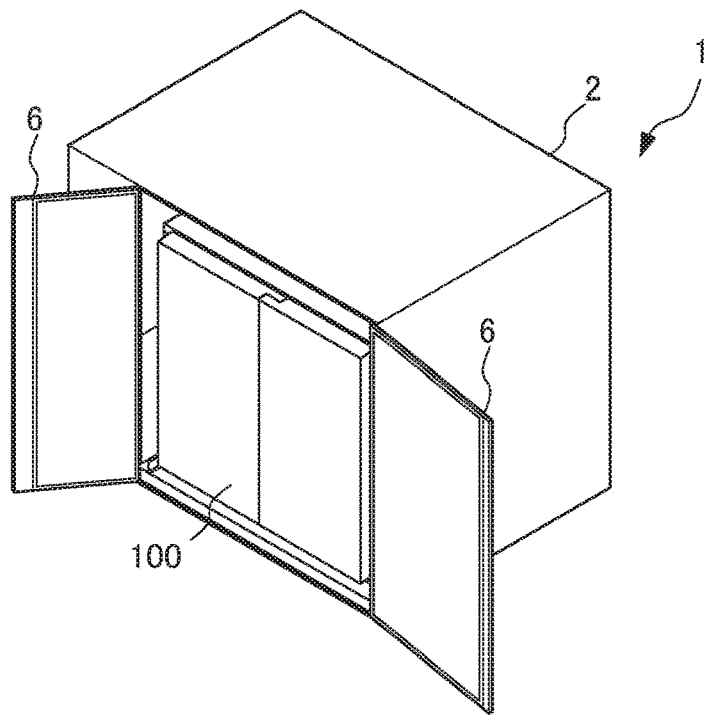
FIG. 13 is a perspective drawing of the storage container (100) inside of the aircraft container (1).

FIG. 13 is a perspective drawing of the storage container (100) inside of the aircraft container (1).

Before inserting the storage container (100) into the container body (2), the operator will affix the hooks (10, 10) and the pulleys (12, 12) to their corresponding support bracket (20) as shown in FIGS. 6-11. Specifically, the hooks (10, 10) are affixed to the support brackets (20) located on the loading entrance (4) side (front side) of the left side and far side of the loading entrance (4) (back side) on the left side using the fitting connection (18). The pulleys (12, 12) are affixed to the support brackets (20) located on the loading entrance (4) side (front side) of the right side and far side of the loading entrance (4) (back side) on the right side using the fitting connection (18). In other words, the hooks (10, 10) and the pulleys (12, 12) attach onto the left and right sides of the floor surface to the support brackets (20) located roughly in each of the four corners.

Next, the end of the wire (14) that is shaped like a ring is hooked onto the rear hook (10) as shown in FIG. 6. Then, the wire (14) is stretched upward and then pulled along the ceiling of the container body (2) from the left side to the right side, and then brought down the right side of the container body (2) where it is wound around the rear pulley (12). The wire (14) is then stretched underneath the front pulley (12) and the loose end of the wire (14) is left outside. At this time, the wire (14) can be left in a slack state. The portion of the wire (14) that was pulled along the ceiling of the container body (2) can be temporarily held in place by adhesive tape.

After the storage container (100) has been inserted into the container body (2), the operator will pull the wire (14) forward to apply tension to the wire (14). The wire (14) will then detach from the adhesive tape and come into contact with the top back side of the storage container (100) and attach to the rear pulley (12). The operator will then wind the wire (14) around the front pulley (12) and pull it upwards, pulling it from the right side to the left side along the top of the storage container (100), and then down the left side of the container body (2). The end of the wire (14) that is shaped like a ring is attached onto the front hook (10) via the turnbuckle (16). Lastly, the main body (16b) of the turnbuckle (16) is rotated in order to lower the end of the wire (14), which will strengthen the hold that the wire (14) has on the storage container (100). In this manner, the auxiliary storage apparatus (7) supports the storage container (100) so that it does not move within the container body (2).

Further, the wire (14) can be placed on the storage container (100) that is placed in the container body (2) using steps different from that described above. Also, a guide plate (102) may be placed on the corners of the storage container (100) where the wire (14) passes through (as shown in FIG. 12) in order to protect the corners of the storage container (100). As shown in FIG. 12, the guide plate (102) is a smooth surface metal plate that has been stamped into an L shape with a specific curvature, and is comprised of the smooth surface part (102a) that the wire (14) comes into contact with and the two rib parts (102b, 102b) on either side of the smooth surface part (102a) which prevent the wire (14) from sliding off of the guide plate (12).

Based on this construction of the first embodiment, the storage container (100) can be firmly stabilized to prevent any movement while placed inside of the container body (2) by the wire (14), based on the operator's use of the turnbuckle (16). From outside of the container body, the operator can reach in between the container body (2) and the storage container (100) to operate the turnbuckle (16), making it easy to tighten and loosen the wire (14).

Further, based on the first embodiment, the pulley (12) rotates in conjunction with the movement of the wire (14). However, it is possible to place the wire (14) in between the rectangular plate (11) and the nut (18c) instead of rotating the pulley (12). It is also possible to use an L shaped bracket instead of the pulley (12) to change the direction of the wire (14) at a right angle.

Second Embodiment of the Auxiliary Storage Apparatus

Since the storage container (100) is close in size to the interior space of the container body (2), inserting and removing the storage container (100) into and out of the container body (2) is not an easy task. For example, if the storage container (100) is slanted during insertion or removal, the storage container (100) will come into contact with the interior of the container body (2), making it difficult to push the storage container (100) in.

The second embodiment of the auxiliary storage apparatus (8), which will be described below, takes these issues into consideration to offer support to the process of inserting and removing the storage container (100) into and out of the container body (2). When the same parts are used in the auxiliary storage apparatus (8) as the auxiliary storage apparatus (7), the same part number will be used and its detailed description will be omitted.

Figure 14:
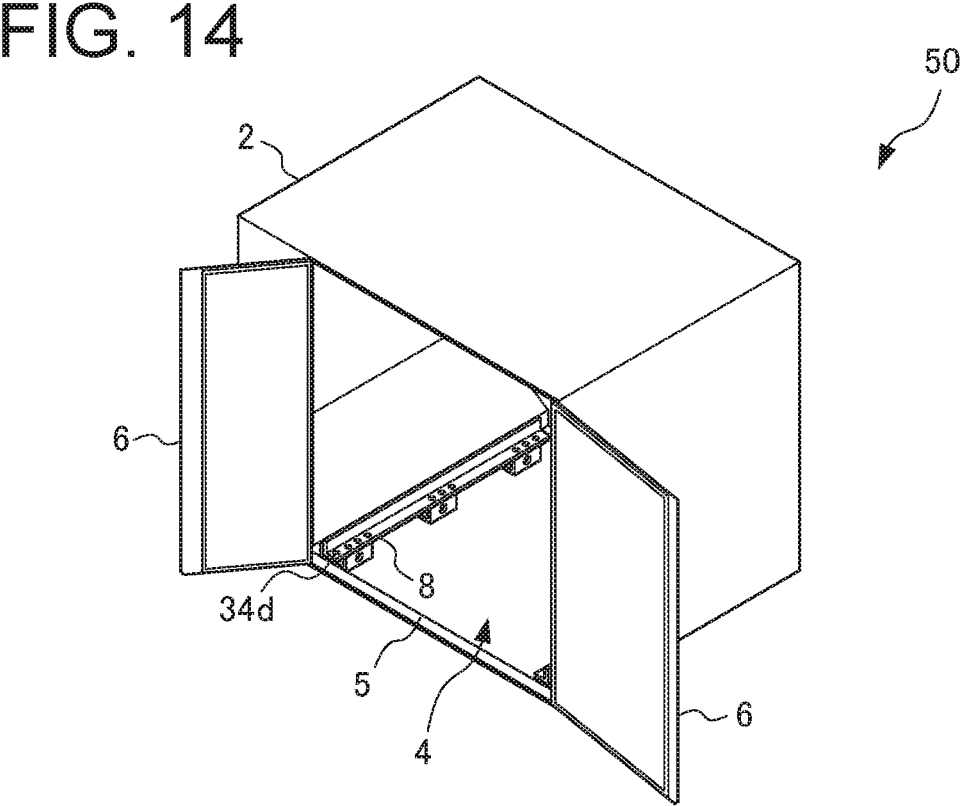
FIG. 14 is an illustration of the exterior view of the auxiliary storage apparatus (8) and the aircraft container (50) that it is installed in under this invention's second embodiment.

As shown in FIG. 14, the auxiliary storage apparatus (8) is affixed to the floor surface of the container body (2) and the storage container (100) is placed on top.

Figure 15:
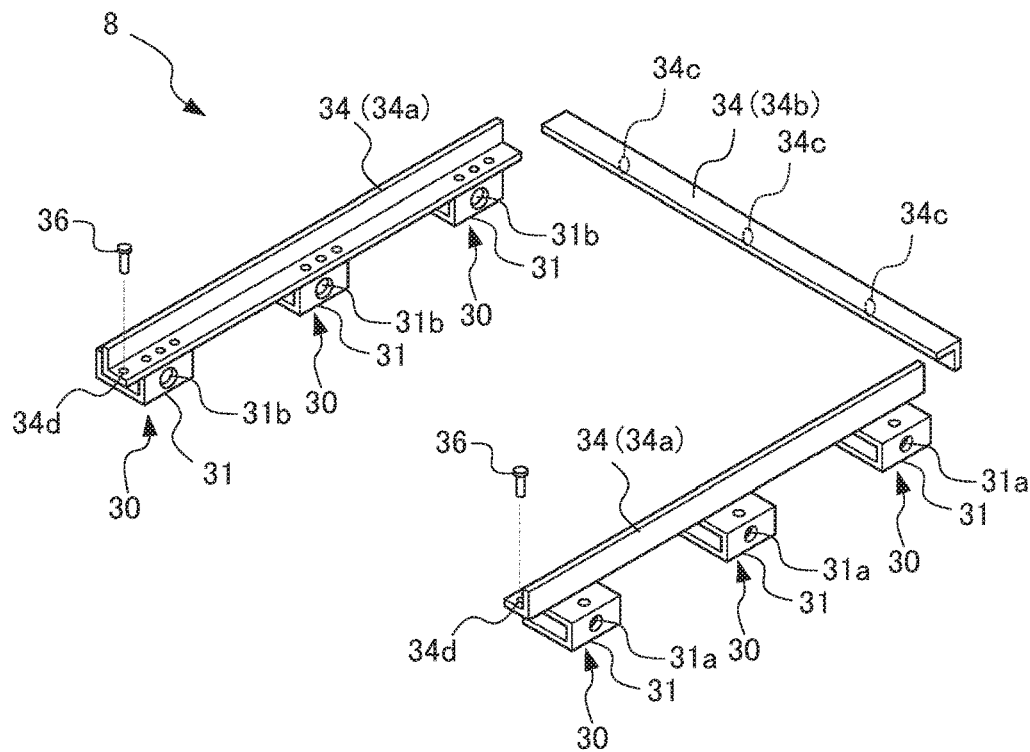
FIG. 15 is an illustration of the auxiliary storage apparatus (8) and its components in this invention's second embodiment.

FIG. 15 is an illustration of the auxiliary storage apparatus (8) of this invention's second embodiment. The auxiliary storage apparatus (8) is comprised of numerous mounting brackets (30), rails (34), and connecting screws (36).

Figure 16:
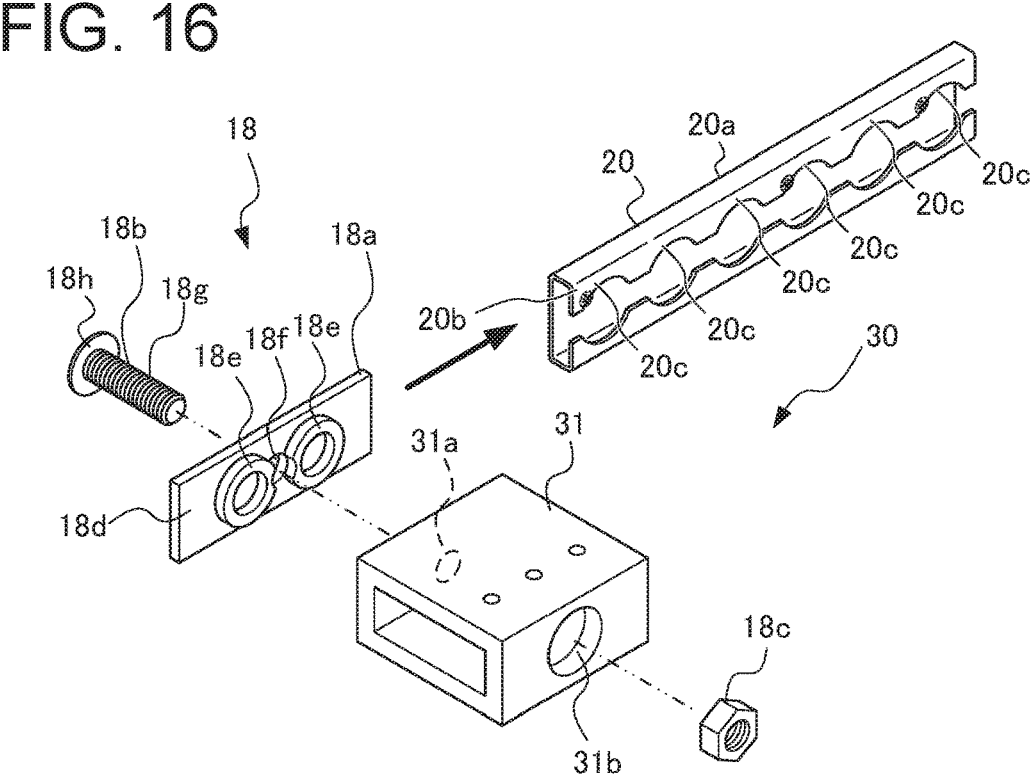
FIG. 16 is a detailed illustration of the components of the mounting bracket (30).

FIG. 16 is a detailed illustration of the components of the mounting bracket (30). The mounting bracket (30) is comprised of the support base (31), which supports the rail (34), and the fitting connection (18) that is also used in the first embodiment.

The support base (31) is a rectangular tube shaped metal part and is located along the left side and right side of the floor surface of the container body (2). The rail (34) is affixed to the top of the support base (31). When looking at the loading entrance (4) of the container body (2) from the front, the rail (34) is located within the same range as the loading entrance (4). Additionally, the top part of the lip (5) is the same height as the surface of the rail (34a, 34a).

There is a hole (31a) on the support base (31) on the side that faces the left side (or the right side) of the container body (2) in which the male screw (18g) of the bolt (18b) can be inserted. On the opposite side of the hole (31a) is a hole (31b). The hole (31b) has a larger diameter than the hole (31a) into which the nut (18c) or the tool that will rotate the nut (18c) can be inserted.

Figure 17:
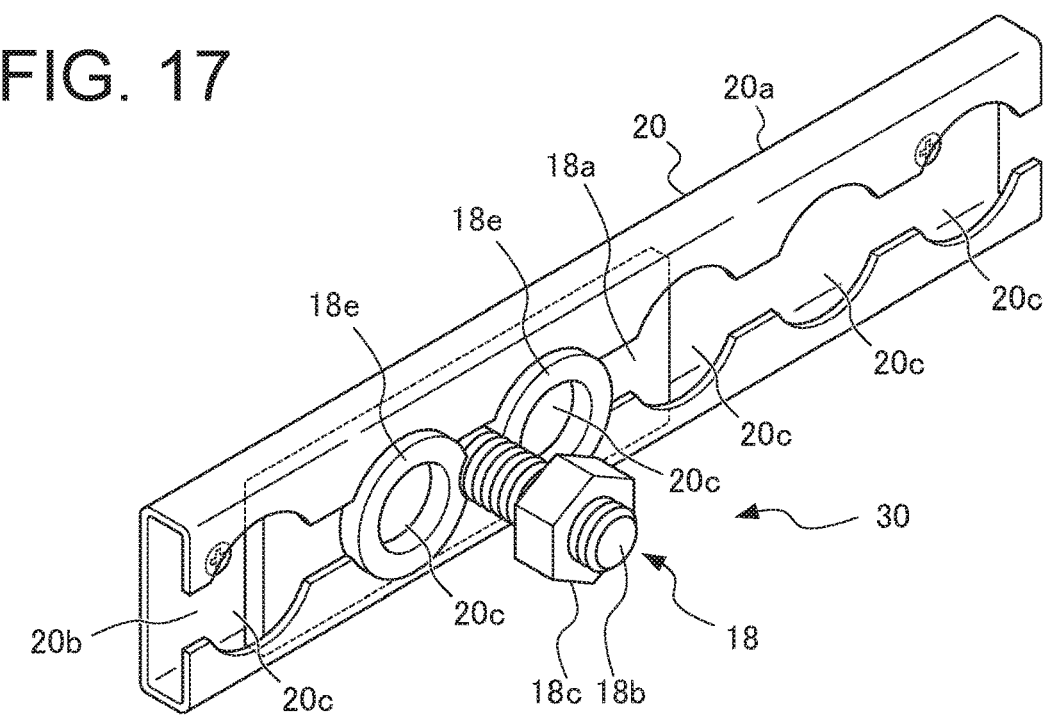
FIG. 17 is a perspective drawing of the protruding part (18e) fitted onto the support bracket (20).

When the operator inserts the slide plate (18a) into the support bracket (20) and the bolt (18b) is aligned with the center of two adjacent widened parts (20c, 20c) on the slit part (20b), the protruding parts (18e, 18e) face the widened parts (20c, 20c). By screwing in the bolt (18b), the protruding parts (18e, 18e) on the slide plate (18a) fit into the widened parts (20c, 20c) as shown in FIG. 17. As such, the sliding movements on the slide plate (18a) in relation to the support bracket (20) are regulated and the bolt (18b) will continue to protrude from the support bracket (20).

When the operator inserts the distal end of the bolt (18b) into the hole (31a) of the support base (31), and uses the nut (18c) to attach the protruding parts (18e, 18e) to the support base (31), the support base (31) is affixed to the container body (2). A total of 6 support bases (31) are affixed along the container body (2) floor surface in two lines of 3 each, stretching from the front to back.

As shown in FIG. 15, the 3 rails (34) are long parts with an L shaped cross section. The 3 rails (34) have smooth surfaces with little friction.

Two of the rails (34a, 34a) are located on the left and right edges of the floor surface of the container body (2) and the third rail (34b) is located on the back side of the container body (2)

The two rails (34a, 34a) are affixed to the top of the three support bases (31) using a flat-head screw. The two rails (34a, 34a) have a tapered concave region on top of the screw hole so that the head of the flat-head screw does not protrude from the rail surface.

The rail (34b) has holes (34c) in which the bolt (18b) can be inserted, along the back side facing the support brackets (20) (refer to FIG. 15). When attaching the rail (34b) to the container body (2), the operator will insert the slide plate (18a) into the support bracket (20), then extend the bolt (18b) through the hole (34c) of the rail (34b) and fix it in place with the nut (18c). In this manner, the rail (34b) is affixed to the back side of the container body (2).

The support bracket (20) has 6 widened parts (20c) and there is flexibility in determining which of the 6 widened parts (20c) to fit the protruding parts (18e, 18e) into. It should be noted that in order to prevent the auxiliary storage apparatus (8) from separating from the support bracket (20) under a large amount of force, the protruding parts (18e, 18e) should be attached to the support bracket (20) using the two rearmost widened parts (20c). In other words, in order for the protruding parts (18e, 18e) to separate from the support bracket (20), they would need to pass through 4 other widened parts (20c), thereby ensuring that the auxiliary storage apparatus (8) will not shift outside of the container body (2).

Based on this, the storage container (100) is placed on top of the 3 rails (34a, 34a, 34b) that are installed on the inside of the container body (2).

Further, when the auxiliary storage apparatus (8) is affixed to the container body (2) and there are 2 unused adjacent widened parts (20c) of the support bracket (20) (of the 6 total), the 2 unused widened parts (20c) can be used to also affix the auxiliary storage apparatus (7) of the first embodiment.

Storage Container with Cooling Feature

Figure 18:
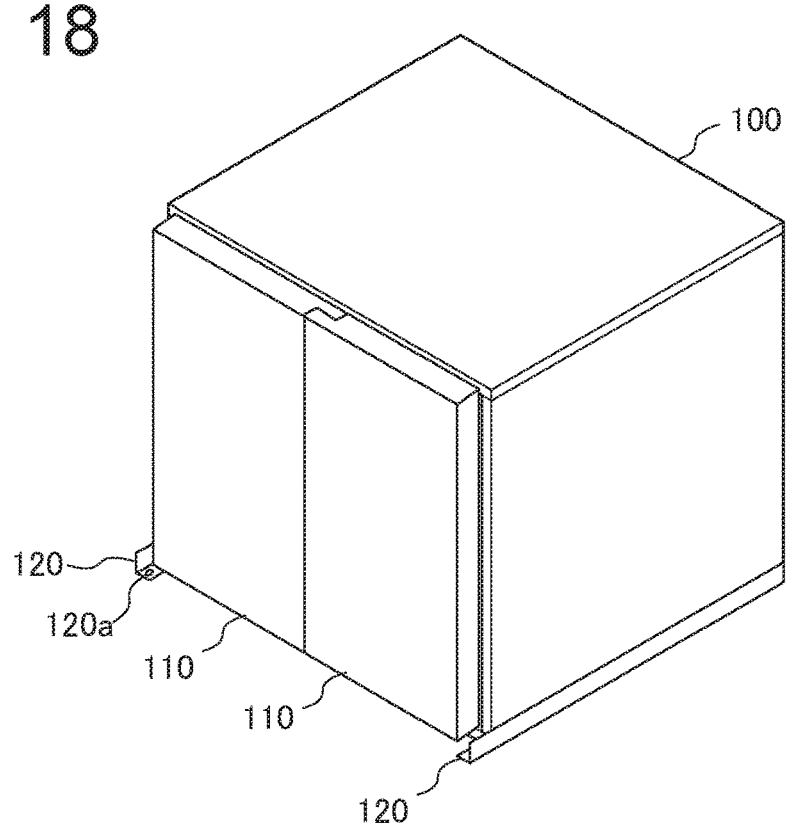
FIG. 18 is a perspective drawing of the storage container (100) with the sliding rail (120) installed.

FIG. 18 is a perspective drawing of the storage container (100) and its construction. The storage container (100) is slightly smaller than the interior space of the container body (2) and is a rectangular box shape that is sized to fit on top of the 3 rails (34). The storage container (100) has opening and closing double doors (110) on the front side. When the doors (110) are opened, goods can be inserted and removed from the storage container (100).

On the bottom side of the storage container (100), there are sliding rails (120, 120) affixed to the two sides that extend from the front to back, which slide along the tops of the rail (34a, 34a) (refer to FIG. 15) when the storage container (100) is moved. The length of the sliding rails (120, 120) is the same as the length of the rails (34a, 34a) (refer to FIG. 15), and the front ends of the sliding rails (120, 120) that are affixed to the storage container (100) protrude out from underneath the storage container (100).

Further, as shown in FIG. 14 and FIG. 15, there is a hole (34d) located on the front end of the rail (34b). As shown in FIG. 15, there is a hole (120a) located on the front end of the sliding rail (120). When the storage container (100) is inserted into the container body (2), the hole (34d) and the hole (120a) align. By inserting a screw (36) into the hole (120a), the rail (34b) and the sliding rail (120) are joined, and the storage container (100) is affixed to the container body (2).

Aircraft Container

Figure 19:
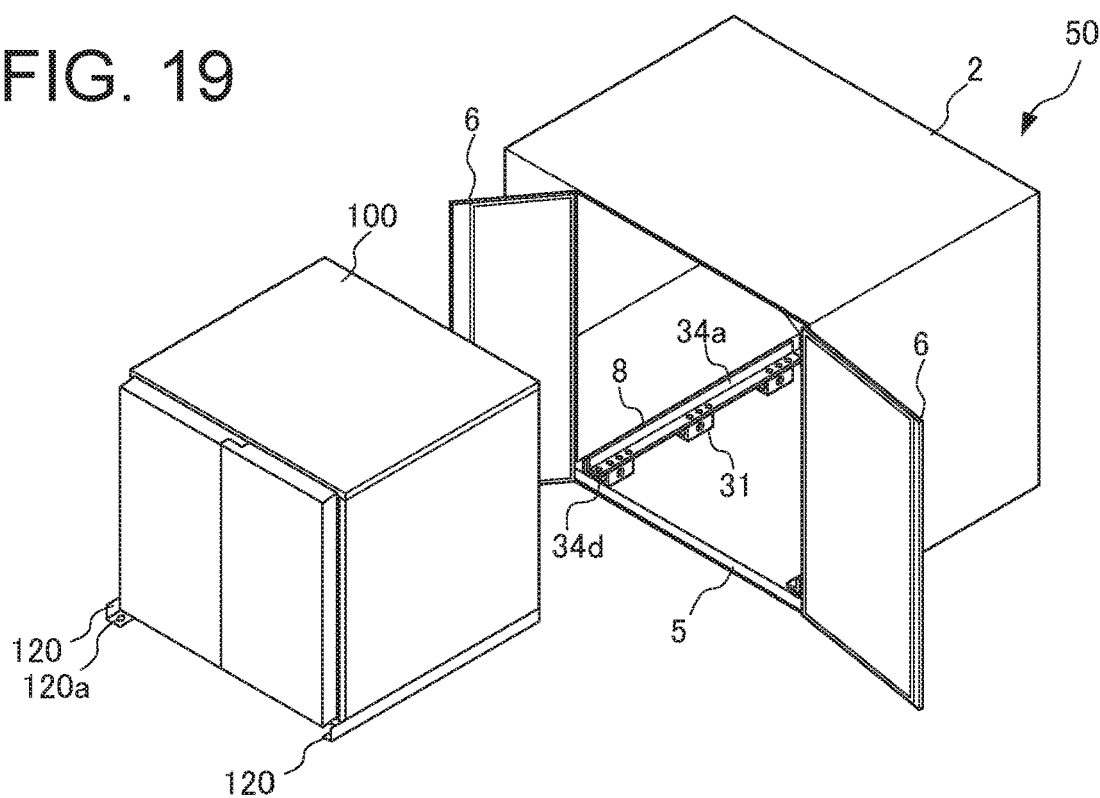
FIG. 19 is a perspective drawing of the storage container (100) prior to being placed into the aircraft container (50).
Figure 20:
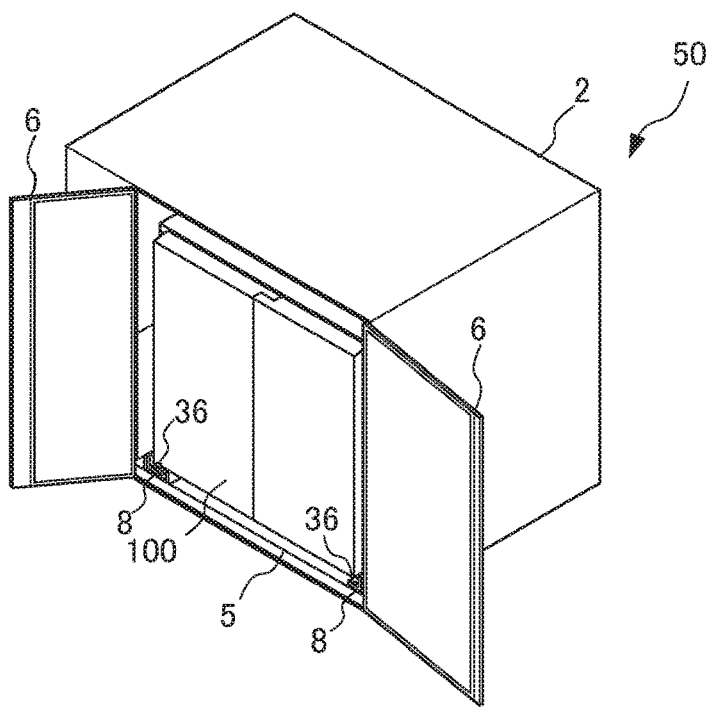
FIG. 20 is a perspective drawing of the storage container (100) placed inside of the aircraft container (50).

FIG. 19 is a perspective drawing of the storage container (100) prior to being placed into the aircraft container (50). FIG. 20 is a perspective drawing of the storage container (100) placed inside of the aircraft container (50).

As shown in FIG. 19, the aircraft container (50) is constructed by affixing the auxiliary storage apparatus (8) onto the floor surface of the container body (2).

In order to affix the auxiliary storage apparatus (8) onto the floor surface of the container body (2), the operator must first use the fitting connection (18) (refer to FIG. 16) to affix the support base (31) to the container body (2) and then affix the rail (34a) to the support base (31). Once the rail (34a) has been affixed to the support base (31), the support base (31) may be affixed to the container body (2). Further, the operator will use the fitting connection (18) to affix the rail (34b) (refer to FIG. 15) to the container body (2).

In order to insert the storage container (100) into the aircraft container (50), the operator must first place the back ends of the sliding rails (120, 120) on the storage container (100) onto the front ends of the rails (34a, 34a). Then, as the storage container (100) is pushed inwards, the storage container (100) moves into the interior of the aircraft container (50) along the rails (34a, 34a) until the bottom back side of the storage container (100) reaches the rail (34b) and the storage container (100) stops. When the operator inserts the screw (36) into the hole (120a), the storage container (100) becomes affixed to the container body (2). As such, the storage container (100) is inserted into the aircraft container (50), as shown in FIG. 20.

The goods may be placed inside of the storage container (100) before the storage container (100) is inserted into the aircraft container (50) or after the storage container (100) has been inserted into the aircraft container (50). Also, a pallet can be inserted onto the floor surface area of the container body (2) that is surrounded by the 3 rails (34) so that the load pressure on the 3 rails (34) as well as the support base (31) can be reduced.

Third Embodiment of the Auxiliary Storage Apparatus

Figure 21:
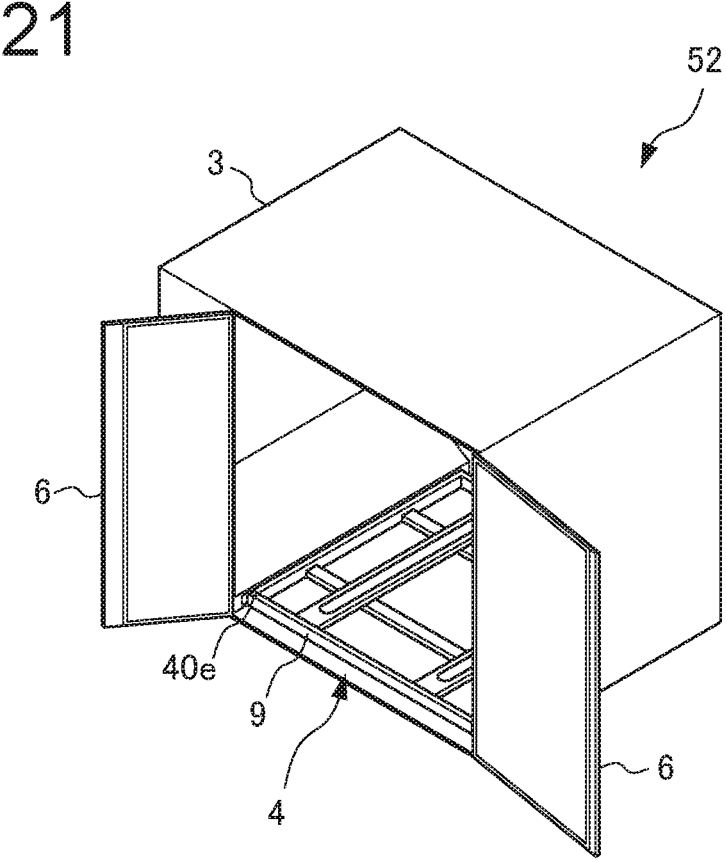
FIG. 21 is an illustration of the exterior view of the auxiliary storage apparatus (9) and the aircraft container (52) that it is installed in under this invention's third embodiment.
Figure 22:
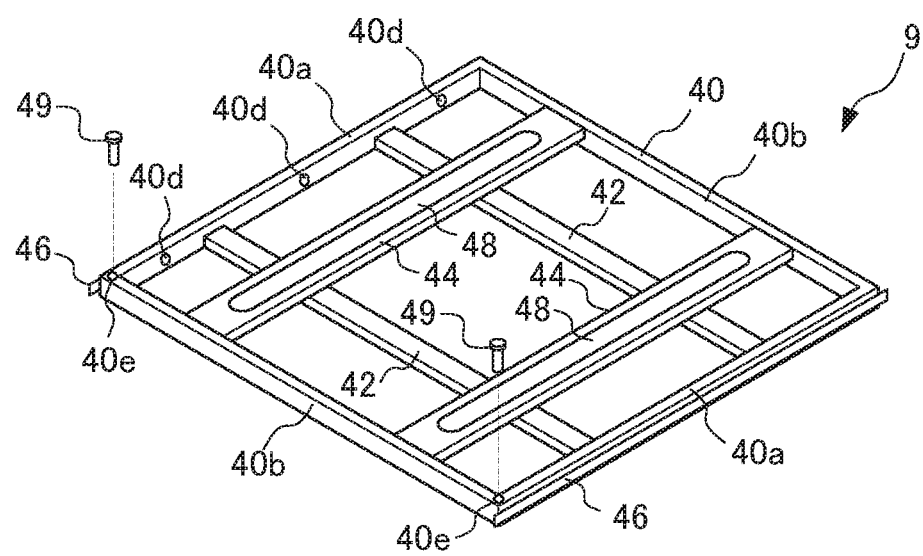
FIG. 22 is a perspective drawing of the auxiliary storage apparatus (9) under this invention's third embodiment.
Figure 23:
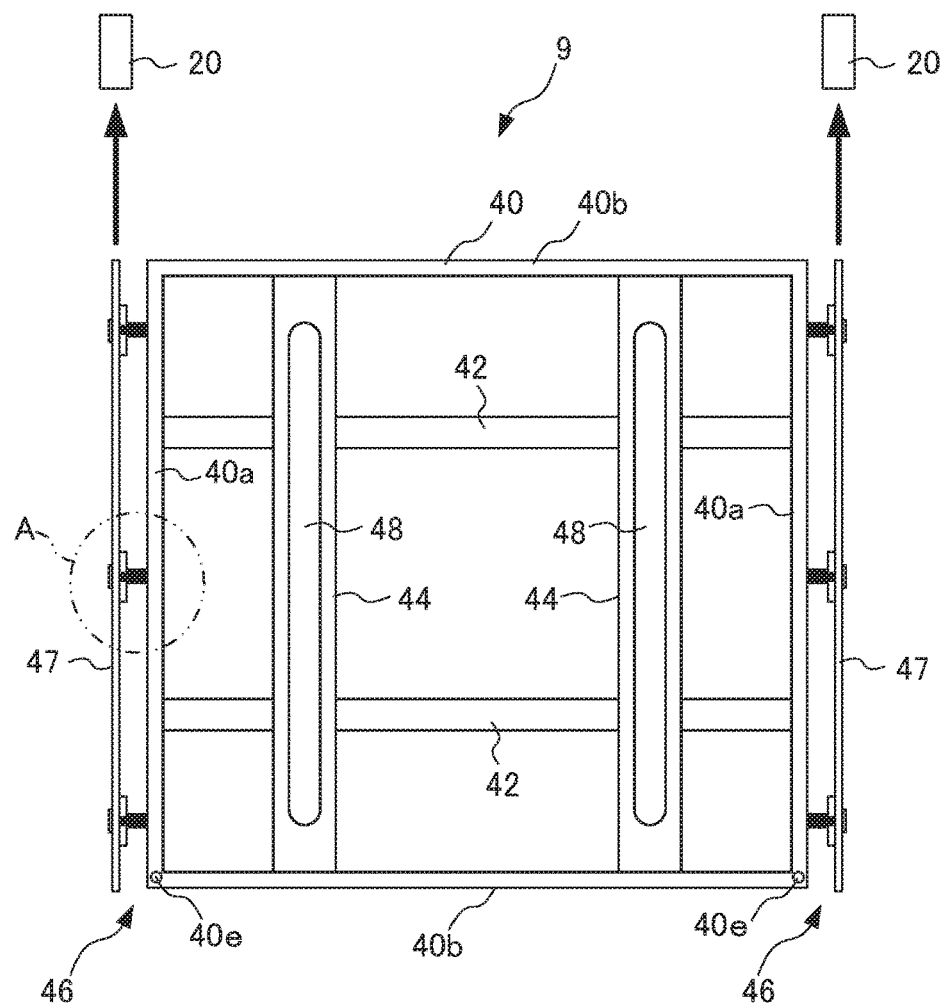
FIG. 23 is a two-dimensional drawing of FIG. 22.

FIG. 21 is an illustration of the exterior view of the auxiliary storage apparatus (9) and the aircraft container (52) that it is installed in under this invention's third embodiment. FIG. 22 is a perspective drawing of the auxiliary storage apparatus (9) under this invention's second embodiment. FIG. 23 is a two-dimensional drawing of FIG. 22. In regards to the auxiliary storage apparatus under the second embodiment (9) that is shown in FIGS. 21-23, parts that are the same as the auxiliary storage apparatus under the first embodiment (7) as shown in FIGS. 1-13 and the auxiliary storage apparatus under the second embodiment (8) as shown in FIGS. 14-20, the same part number will be used and its detailed description will be omitted.

As shown in FIG. 21, the aircraft container (52) is comprised of the container body (3) and the auxiliary storage apparatus (9). The container body (3) is the same construction as the container body (2) shown in FIGS. 2 and 19, minus the lip (5). The auxiliary storage apparatus (9) is affixed to the container body (3) while placed on top of the floor surface of the container body (3).

As shown in FIGS. 22 and 23, the auxiliary storage apparatus (9) is comprised of the frame (40), 2 reinforcement bars (42, 42), 2 support plates (44, 44), mounting bracket (46), and connecting screw (49).

The frame (40) is comprised of rectangular tube rods (40a, 40a, 40b, 40b) that are formed into a rectangular shape. The length of the rods that stretch left and right (40b, 40b) on the frame (40) is equivalent to the length of the floor surface of the container body (3) stretching left and right minus the 2 support brackets (20) that protrude out. The length of the rods that stretch front and back (40a, 40a) is equivalent to the length of the floor surface of the container body (3) stretching front and back minus the protruding length of 1 support bracket (20). Also, as shown in FIG. 22, the frame (40) has holes (40c, 40d).

Figure 24:
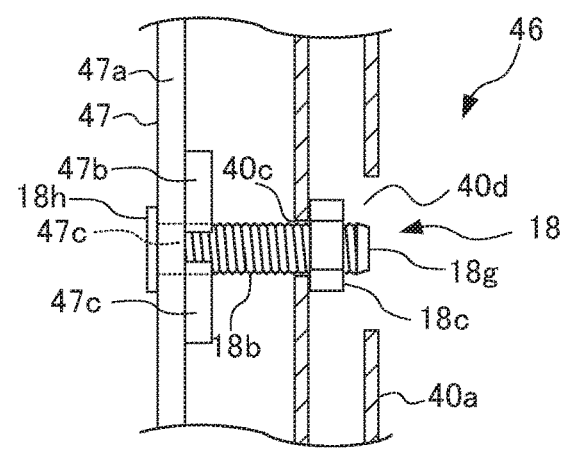
FIG. 24 is a two-dimensional drawing of a partial cross-section of the area marked as A in FIG. 23.

FIG. 24 is a two-dimensional drawing of a partial cross-section of the area marked as A in FIG. 23. When the auxiliary storage apparatus (9) is placed on the floor surface of the container body (3), there are holes (40c) in the rods (40a), which face the support bracket (20) and where the bolt (18b) can be inserted. Also, along the rods (40a, 40a), on the opposite side of the holes (40c, 40c) and on the interior side of the frame (40), there are holes (40d), which are larger than the holes (40c). In other words, the rods (40a, 40a) each have a hole (40c) and a larger hole (40d) in three locations.

As shown in FIGS. 22 and 23, the reinforcement bar (42) is made from a rectangular tube rod with a lower height than the rods (40a, 40b) that make up the frame (40). The 2 reinforcement bars (42, 42) are lined up inside of the frame (40) so that they are placed front to back, are parallel to the rods (40b, 40b), and both ends are affixed to the rods (40a, 40a). The reinforcement bar (42) is affixed on the lower portion of the rods (40a, 40a), which results in a height variance between the top of the rod (40a, 40a) and the top of the reinforcement bar (42).

The 2 support plates (44, 44) are made of a belt plate and are situated on the inside of the frame (40) so that they are placed from left to right and parallel to the rods (40a, 40a) and on top of the reinforcement bar (42). Both ends are affixed to the rods (40b, 40b). The height of the support plate (44) is equivalent to the height variance between the top of the rod (40a, 40a) and the top of the reinforcement bar (42). As such, the top of the frame (40) and the top of the 2 support plates (44, 44) are on the same plane. The top of the frame (40) and the top of the 2 support plates (44, 44) are smooth, low friction surfaces.

There is a bearing part (48) consisting of numerous bearings lined up from front to back and affixed to the support plate (44).

As shown in FIG. 24, the mounting bracket (46) consists of the slide plate (47), and the bolt (18b) and nut (18c) that were also used in the first embodiment.

The slide plate (47) consists of the metal plate (47a), protruding parts (47b, 47b), and a hole (47c).

The metal plate (47a) is a rectangular strip plate with the same length as the rod (40a) in which the support bracket (20) can be inserted. Except for the length, the measurements of the metal plate (47a) are the same as the metal plate (18d) as described in FIG. 7. The protruding parts (47b, 47b) and the hole (47c) are the same shape as the protruding parts (18e, 183) and the hole (180 as described in FIG. 7.

There are 3 sets of the protruding parts (47b, 47b) and the hole (47c) on the metal plate (47a). Specifically, when there are 3 support brackets (20) inserted into the support plate (47a), the location of the protruding parts (47b, 47b) and the hole (47c) of the metal plate (47a) will be determined by the protruding parts (47b, 47b) being aligned with the 2 widened parts (20c, 20c) of the support bracket (20).

The bolt (18b) is inserted into the hole (47c) on the metal plate (47a) from the opposite side of the protruding parts (47b, 47b). The head (18h) sits against the rim of the hole (47c) while the male screw (18g) protrudes out from between the protruding parts (47b, 47b).

Further, by inserting a bolt (18b) into each of the 3 holes (40c) in the rod (40a) and securing the ends of the bolt (18b) with a nut (18c), the slide plates (47, 47) are affixed to the rod (40a). The nut (18c) is attached to the bolt (18b) in a manner in which the slide plates (47, 47) can slide from left to right.

Figure 25:
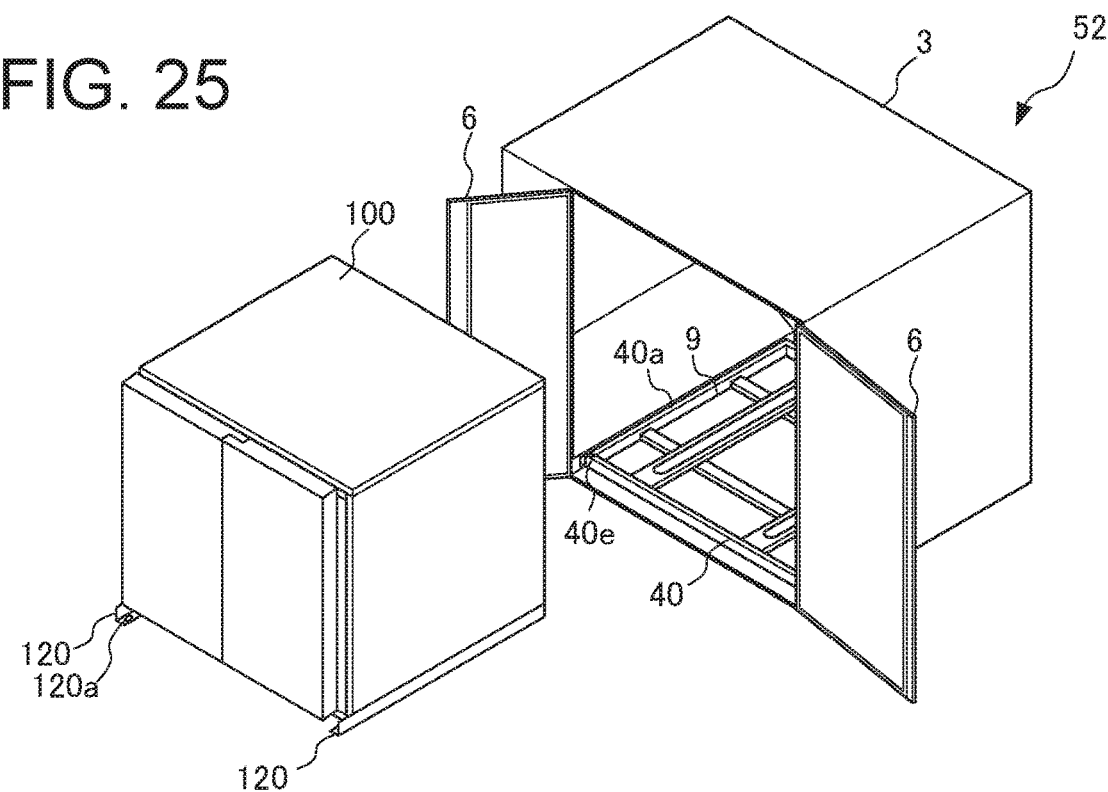
FIG. 25 is a perspective drawing of the auxiliary storage apparatus (9) affixed to the flooring of the container (3).

To place the frame (40) on top of the floor surface of the container body (3), the operator will place the front end of the frame (40) onto the front part of the floor surface of the container body (3). With the slide plates (47, 47) facing the support bracket (20), the frame (40) is pushed towards the back until the frame (40) reaches the support bracket (20) that is located on the bottom back side of the container body (3). In this manner, the frame (40) is placed onto the floor surface of the container body (3), with 3 support brackets (20) inserted into the slide plates (47, 47), as shown in FIG. 25.

At this time, the 2 widened parts (20c, 20c) on each of the 3 support brackets (20) on the bottom left side and bottom right side face the protruding parts (47b, 47b). By attaching these parts with the nut (18c), the widened parts (20c, 20c) and the protruding parts (47b, 47b) are joined, affixing the auxiliary storage apparatus (9) to the container body (3). In this manner, the aircraft container 52 is constructed.

In order to insert the storage container (100) into the aircraft container (52), the operator must first place the back ends of the sliding rails (120, 120) of the storage container (100) onto the front end of the frame (40) and then push the storage container (100) towards the back. The storage container (100) will slide along the rods (40a, 40a) and the support plates (44, 44) into the container body (3). In other words, the rods (40a, 40a) function in the same manner as the rails (34a, 34a) as described in FIG. 14. Additionally, the bearing part (48) comes into contact with the bottom side of the storage container and rotates in the same direction as the movement of the storage container.

Figure 26:
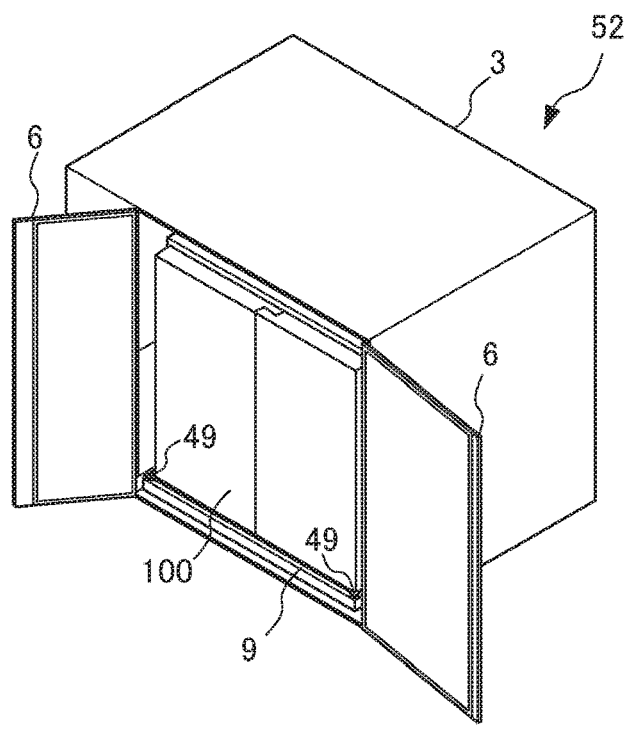
FIG. 26 is a perspective drawing of the storage container (100) placed inside of the aircraft container (52).

When the storage container (100) touches the back of the aircraft container (52), the storage container (100) will stop. In this state, the storage container (100) is inserted into the aircraft container (52) and the opening and closing doors (6) can be closed. Similar to the second embodiment as described in FIG. 14, there is a hole (40e) on the front end of the frame (40) and a hole (120a) on the front end of the sliding rail (120). When the storage container (100) is inserted into the aircraft container (52), the hole (40d) and the hole (120a) align. When the operator inserts a screw (49) into the hole (120a), the sliding rail and the frame (40) are joined and the storage container (100) is affixed to the container body (3), and the storage container (100) is inserted into the aircraft container (52) as shown in FIG. 26.

Further, when the auxiliary storage apparatus (9) is affixed to the container body (2) and there are 2 unused adjacent widened parts (20c) of the support bracket (20) (of the 6 total), the 2 unused widened parts (20c) can be used to also affix the auxiliary storage apparatus (7) of the first embodiment.

Based on the construction of the first, second, and third embodiments as explained above, the non-regulated temperature containers that are currently in use (container body (2) (3)) can be used along with the support brackets (20) located inside to stabilize and affix the storage container with specific features (100) within the container body (2) (3). As such, it becomes easy to place a storage container with cooling features that is nearly the same size as the interior space of a non-regulated temperature container into a non-regulated temperature container so that the non-regulated temperature container can be used as a container with cooling features.

Further, based on the second and third embodiments, by adjoining 2 adjacent widened parts (20c) (of the 6 total) of the support bracket (20) to 2 of the protruding parts (18e) (47b), the auxiliary storage apparatus (8) (9) is affixed to the container body (2) (3) so that the auxiliary storage apparatus (8) (9) will not separate from the support brackets (20) even with a large amount of force. Particularly, with the auxiliary storage apparatus (8) in the second embodiment and its lip (5), even if the bolt (18b) were to break and the support base (31) and support bracket (20) were to separate, the support base (31) would come into contact with the lip (5) and temporarily prevent the support base (31) and the rails (34a) from falling off. According to the second and third embodiments, it is stated that the storage container (100) should be affixed to the container body (2) (3) using a screw (36) (49), but as long as the sliding rail (120) is joined to the rail (34) or the frame (40), then any part may be used.

According to the first, second, and third embodiments, the storage container (100) is described as a storage container with cooling features, but the storage container can also be fitted with heating or humidifying features as well. As such, a non-regulated temperature container can be used as a container that offers features other than cooling. Further, based on this embodiment, the container body (2) (3) used is the standard LD3 model, but other types of containers can be used. Further, based on this embodiment, two protruding parts (18e) (47b) are joined to the 2 adjacent widened parts (20c) (of the 6 total), but there can be 3 protruding parts (18e) (47b) or even more.

SYMBOL DESCRIPTIONS 1 aircraft container
2, 3 container body
4 loading entrance
5 lip
6 opening and closing door
8, 9 auxiliary storage apparatus
10 hook
11 rectangular plate
12 pulley
12 a center hole
12 b groove
14 wire
16 turnbuckle
18 fitting connection
18 a slide plate 18 b bolt
18 c nut
18 d metal plate
18 e protruding part
18 f hole
18 g male screw
18 h head
19 flange
20 support bracket
20 a main body part
20 b slit part
20 c widened part
21 screw
30 mounting bracket
31 support base
31 a, 31 b hole
34, 34 a, 34 b rail
34 c, 34 d hole
36, 49 screw
40 frame
40 a, 40 b rod
40 c, 40 d, 40 e hole
42 reinforcement bar
44 support plate
46 mounting bracket
47 slide plate
48 bearing
52 aircraft container
100 storage container
110 opening and closing door
120 sliding rail
120 a hole

The invention claimed is:

1. An auxiliary storage apparatus comprising:
a non-regulated temperature container comprising:
   a floor surface; and
   a plurality of side walls extending perpendicularly from the floor surface and intersecting with the floor surface at four corners;
a storage container positioned within the non-regulated temperature container;
a wire configured to pass over the storage container positioned within the non-regulated temperature container;
a first support bracket and a second support bracket located on a first side wall of the plurality of side walls;
a cargo support belt having a plurality of end brackets;
a first hook and a second hook respectively configured to affix to the first support bracket and the second support bracket and configured to join the plurality of end brackets of the cargo support belt to the four corners at which the side walls intersect with the floor surface, the first hook configured to affix to the first support bracket at a loading entrance side of the non-regulated temperature container;
a first directional switch element and a second directional switch element respectively configured to affix to a third support bracket and a fourth support bracket located on a second side wall of the plurality of sidewalls opposite the first side wall and configured to interact with the wire to change a direction of a force applied to the wire; and
a turnbuckle coupled to the first hook.

2. The auxiliary storage apparatus of claim 1 further comprising:
a first rail and a second rail configured to be positioned on a first edge and a second edge of the floor surface of the non-regulated temperature container, the first edge opposite the second edge, wherein the first rail and the second rail are oriented to receive the storage container when positioned on the first edge and the second edge of the floor surface, wherein the first rail and the second rail are configured respectively to receive a first sliding rail and a second sliding rail affixed to a bottom part of the storage container, the first sliding rail and the second sliding rail configured to slide along a top surface of the first rail and a top surface of the second rail when the storage container is received within the non-regulated temperature container;
a first mounting bracket configured to affix the first rail to the non-regulated temperature container by coupling with the first support bracket, wherein the first mounting bracket is configured to affix to a first end bracket of the plurality of end brackets of the cargo support belt;
a second mounting bracket configured to affix the second rail to the non-regulated temperature container by coupling with the second support bracket, wherein the second mounting bracket is configured to affix to a second end bracket of the plurality of end brackets of the cargo support belt; and
a first engaging member configured to regulate movement of the storage container by joining the first rail and the first sliding rail when the storage container is received within the non-regulated temperature container; and
a second engaging member configured to regulate movement of the storage container by joining the second rail and the second sliding rail when the storage container is received within the non-regulated temperature container.

3. The auxiliary storage apparatus of claim 2, wherein the non-regulated temperature container further comprises a lip on the floor surface near a loading entrance of the non-regulated temperature container, wherein the lip is configured such that a height of a topmost portion of the lip is the same as a height of the top surface of the first rail and the top surface of the second rail when the first rail and the second rail are positioned on the floor surface.

4. The auxiliary storage apparatus of claim 2 further comprising a frame that includes the first rail and the second rail, wherein the frame is configured to be positioned on the floor surface of the non-regulated temperature container.

5. The auxiliary storage apparatus of claim 4 further comprising bearings configured to interact with a bottom side of the storage container and spin when the storage container is received and removed from the non-regulated temperature container.

6. An aircraft container comprising the auxiliary storage apparatus of claim 1, wherein the auxiliary storage apparatus is installed within the non-regulated temperature container.

* * * * *